(12) United States Patent
Choi

(10) Patent No.: US 12,547,999 B2
(45) Date of Patent: Feb. 10, 2026

(54) SECURITY KEY INPUT SYSTEM AND METHOD USING ONE-TIME KEYPAD

(71) Applicant: Seungshin Choi, Seoul (KR)

(72) Inventor: Seungshin Choi, Seoul (KR)

( * ) Notice: Subject to any disclaimer, the term of this patent is extended or adjusted under 35 U.S.C. 154(b) by 0 days.

(21) Appl. No.: 18/738,429

(22) Filed: Jun. 10, 2024

(65) Prior Publication Data

US 2024/0330881 A1   Oct. 3, 2024

Related U.S. Application Data

(60) Division of application No. 18/341,024, filed on Jun. 26, 2023, now Pat. No. 12,271,874, which is a
(Continued)

(30) Foreign Application Priority Data

Aug. 31, 2015  (KR) .......... 10-2015-0122649
Nov. 4, 2015   (KR) .......... 10-2015-0154494
(Continued)

(51) Int. Cl.
  *G06Q 20/10*   (2012.01)
  *G06Q 20/32*   (2012.01)
  *G06Q 20/40*   (2012.01)

(52) U.S. Cl.
  CPC ..... *G06Q 20/1085* (2013.01); *G06Q 20/3278* (2013.01); *G06Q 20/4014* (2013.01)

(58) Field of Classification Search
  CPC .......... G06Q 20/1085; G06Q 20/3278; G06Q 20/4014
(Continued)

(56) References Cited

U.S. PATENT DOCUMENTS

2006/0037067 A1   2/2006   Morris et al.
2007/0096946 A1   5/2007   Kim et al.
(Continued)

FOREIGN PATENT DOCUMENTS

KR   10-1016041   2/2011
KR   10-1045257   6/2011

OTHER PUBLICATIONS

English translation of 10-1045257.
English translation of 10-1016041.

*Primary Examiner* — Courtney P Jones
(74) *Attorney, Agent, or Firm* — Sughrue Mion, PLLC

(57) ABSTRACT

Provided is a security key input system using a one-time keypad. The security key input system may include: a keypad input unit configured to output a security keypad including one or more null keys each having no identification mark written thereon, and receive a security key from a user; a control unit comprising a one-time keypad generator configured to generate a one-time keypad; an input terminal comprising an NFC recognition unit configured to provide the one-time keypad generated by the one-time keypad generator to an output terminal through NFC with the output terminal contacted with the input terminal; a display module; an NFC recognition module configured to receive the one-time keypad from the input terminal through the NFC recognition unit; and the output terminal comprising a controller configured to output the one-time keypad received from the NFC recognition module through the display module.

10 Claims, 22 Drawing Sheets

Related U.S. Application Data continuation of application No. 15/207,856, filed on Jul. 12, 2016, now Pat. No. 11,727,371.

(30) Foreign Application Priority Data

| Nov. 4, 2015 | (KR) | 10-2015-0154496 |
|---|---|---|
| Dec. 10, 2015 | (KR) | 10-2015-0176170 |
| Jan. 7, 2016 | (KR) | 10-2016-0001814 |
| Jan. 22, 2016 | (KR) | 10-2016-0008115 |
| Feb. 22, 2016 | (KR) | 10-2016-0020838 |

(58) Field of Classification Search
USPC .................................................. 705/43
See application file for complete search history.

(56) References Cited

U.S. PATENT DOCUMENTS

| 2009/0098825 | A1 | 4/2009 | Huomo et al. |
| 2011/0145564 | A1 | 6/2011 | Moshir et al. |
| 2013/0246276 | A1 | 9/2013 | Ooi |
| 2014/0096201 | A1* | 4/2014 | Gupta ............ G06F 21/83 726/4 |
| 2015/0072654 | A1 | 3/2015 | Moshir et al. |
| 2016/0080152 | A1 | 3/2016 | Pieczul et al. |
| 2016/0080937 | A1 | 3/2016 | Pieczul et al. |
| 2016/0125181 | A1* | 5/2016 | Dai Zovi ........ G06F 21/36 726/19 |
| 2016/0125411 | A1 | 5/2016 | Briggs et al. |
| 2016/0128118 | A1* | 5/2016 | Duffell ......... H04W 12/04 455/41.2 |
| 2016/0171461 | A1 | 6/2016 | Hoover et al. |
| 2016/0306958 | A1 | 10/2016 | Dow et al. |
| 2016/0307380 | A1* | 10/2016 | Ho ............. G10L 17/00 |
| 2016/0314468 | A1* | 10/2016 | Smith ........... G07F 7/1041 |
| 2017/0046704 | A1* | 2/2017 | Büchner ........ G06Q 20/322 |
| 2017/0090750 | A1 | 3/2017 | Forte et al. |
| 2020/0210557 | A1* | 7/2020 | Pike ............ G06F 21/62 |

\* cited by examiner

FIG. 10
FIG. 11
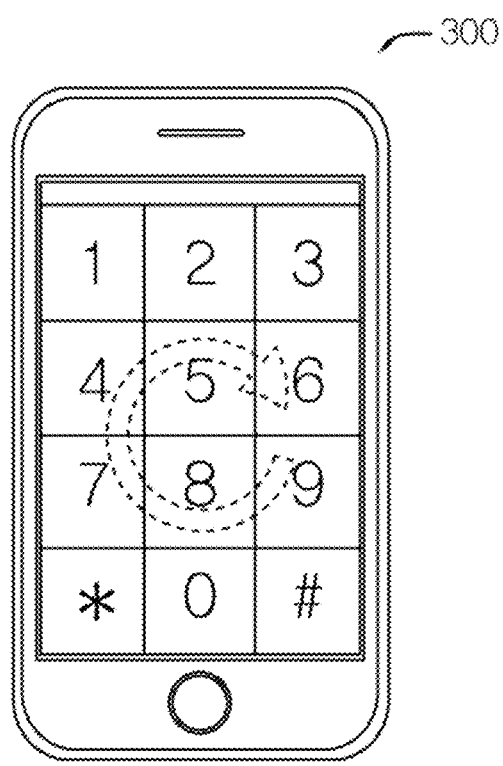
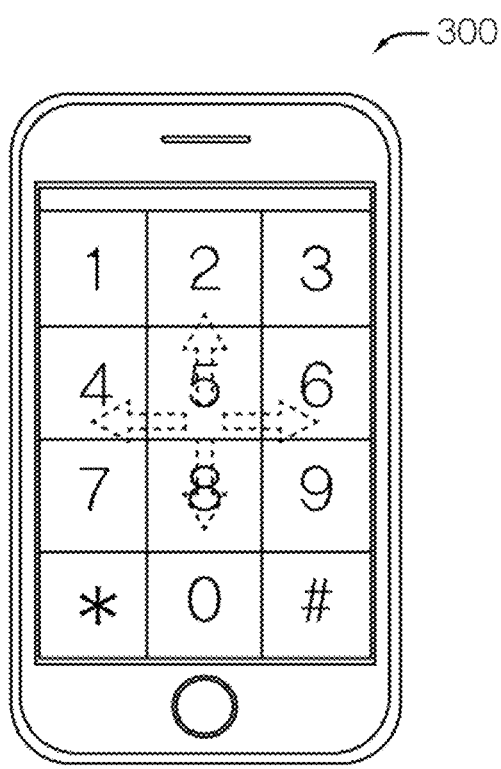

Arrangement Key : 8757214493B560BA81

SECURITY KEY INPUT SYSTEM AND METHOD USING ONE-TIME KEYPAD

CROSS-REFERENCE TO RELATED APPLICATIONS

This application is a divisional application of U.S. patent application Ser. No. 18/341,024, filed on Jun. 26, 2023, which is a continuation of U.S. patent application Ser. No. 15/207,856, filed on Jul. 12, 2016, now U.S. Pat. No. 11,727,371, issued on Aug. 15, 2023, which claims priority to Korean Patent Application No. 10-2015-0176170, filed on Dec. 10, 2015, Korean Patent Application No. 10-2015-0154496,filed on Nov. 4, 2015, Korean Patent Application No. 10-2015-0154494, filed on Nov. 4, 2015, Korean Patent Application No. 10-2015-0122649, filed on Aug. 31, 2015, Korean Patent Application No. 10-2016-0020838, filed on Feb. 22, 2016, Korean Patent Application No. 10-2016-0008115, filed on Jan. 22, 2016, and Korean Patent Application No. 10-2016-0001814, filed on Jan. 7, 2016, in the Korean Intellectual Property Office, the disclosures of which are incorporated by reference herein in their entireties.

BACKGROUND

1. Technical Field

The present disclosure relates to a security key input system and method which enables a user to input a security key (password) through a one-time keypad (OTK) in a state where physical security is secured.

2. Related Art

Recently, with the increase in scale of electronic settlement means, a technology for securing the security for electronic authentication means has been recognized as an important technology and business line.

The security technology may be roughly divided into electronic security technology and physical security technology.

The electronic security technology refers to a technology for preventing a leakage of security information through electronic means. The electronic security technology may include a firewall or security program for preventing system penetration through online hacking or terminal cloning through an illegal program such as spyware.

The physical security technology refers to a technology for preventing a leakage of security information through physical means. The physical security technology may include a film for preventing a fingerprint from remaining on a security key input screen and a barrier formed on a password input system to block other people's watching.

The electronic security technology of the security technology has been improved through a lot of investment and research development.

In reality, however, security accidents through physical means frequently occur. However, since they tends to consider that physical security is a portion to which each individual must pay attention, they do not make sufficient effort to technically prevent the security accidents through physical means.

For example, a person of malicious intent may install a credit card duplicator in an ATM (Automated Teller Machine) of a bank, install a small camera to acquire a password inputted by a user through a video, and use the duplicated credit card.

Furthermore, the password of a door lock installed in the front door of a private house may be leaked. In this case, a person of malicious intent may watch a user inputting the password behind his back, in order to acquire the password.

Korean Patent No 10-1045257 has disclosed a method for preventing a password exposure. As illustrated in FIG. 1, the key arrangement of a password input window may be randomly arranged, and a user may input a password through an arrow key input in order to prevent a leakage of the password.

In the related art, however, when a person of malicious intent videos the password input window of the user through a small camera, a leakage of the password cannot be prevented.

That is, when a password is leaked by physical means, the method cannot prevent a security accident.

PRIOR ART DOCUMENT

Patent Document (001) Korean Patent No. 10-1045257
(002) Korean Patent No. 10-1016041

SUMMARY

Various embodiments are directed to a security key input system and method which is capable of reducing a concern about password exposure, even though a user inputting a pass word of a keypad input device such as a door lock or input window of ATM.

Also, various embodiments are directed to a security key input system and method which is capable of securing security and improving usability, because a security key can be inputted to various types of keypad input devices using a one-time keypad generated through a smart terminal.

Also, various embodiments are directed to a security key input system and method which is capable of improving security, fun and usability because a security key can be inputted to various types of systems through graphic elements and a security key input system.

Also, various embodiments are directed to a security key input system and method which generates a one-time keypad of which the key arrangement is randomly set, when a password is inputted on a terminal in case where a mobile storage medium is inserted into the terminal, and receives a password on the one-time keypad, thereby improving the security of the mobile storage medium.

BRIEF DESCRIPTION OF THE DRAWINGS

FIG. 10 is a diagram illustrating an example in a one-time keypad is generated, the one-time keypad being applied to the security key input system and method according to the embodiment of the present invention.

FIG. 11 is a diagram illustrating another example in a one-time keypad is generated, the one-time keypad being applied to the security key input system and method according to the embodiment of the present invention.

DETAILED DESCRIPTION

Figure 1:
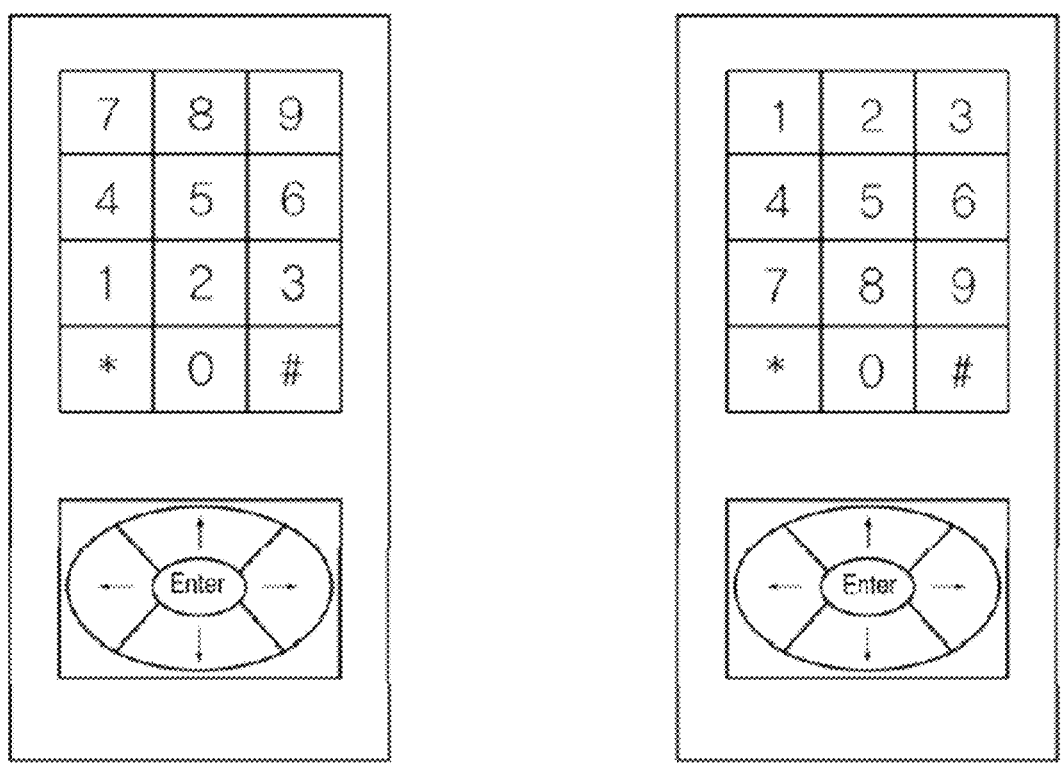
FIG. 1 is a diagram illustrating an example of a conventional security key input method.
Figure 2:
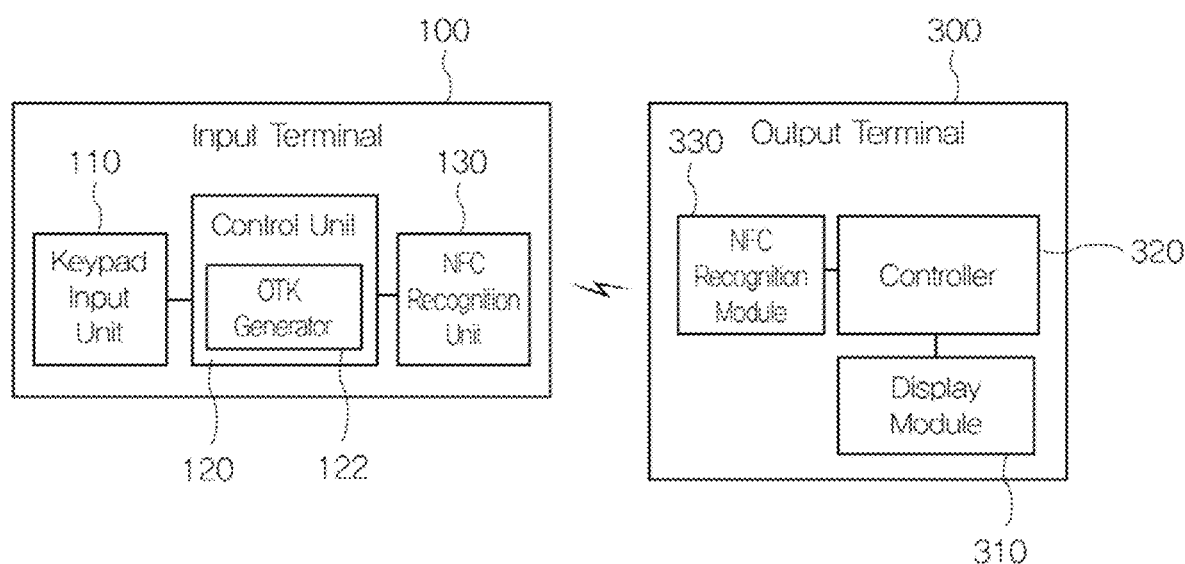
FIG. 2 is a block diagram illustrating a security key input system using a one-time keypad according to a first embodiment of the present invention.

FIG. 2 is a block diagram illustrating a security key input system using a one-time keypad according to a first embodiment of the present invention.

The security key input system using a one-time keypad according to the first embodiment of the present invention generates a one-type keypad through an input terminal. As illustrated in FIG. 2, the security key input system includes an input terminal 100 and an output terminal 300.

At this time, the input terminal 100 may include various devices such as an ATM 100A, a door lock 100B, a safe 100C and a computer terminal 100D, which receive a password (hereafter, referred to as 'security key').

The input terminal 100 includes a keypad input unit 110, a control unit 120 and an NFC (Near Field Communication) recognition unit 130.

The keypad input unit 110 is an input window installed in the input terminal 100, and the input terminal 100 receives a security key from a user through the keypad input unit 110. In general, the keypad input unit 110 may be implemented with a touch panel, but a button-type input device can be applied as the keypad input unit 110.

The control unit 120 includes a one-time keypad generator 122 for generating a one-type keypad.

The one-time keypad generator 122 serves to generate a keypad of which the key arrangement is randomly set. Whenever a user wants to input a security key, the one-time keypad generator 122 generates and provides a new one-time keypad.

The NFC recognition unit 130 provides the one-time keypad generated through the one-time keypad generator 122 to the output terminal 300 through NFC with an NFC recognition module 330 installed in the output terminal 300 contacted with the NFC recognition unit 130.

The output terminal 300 includes a display module 310, a controller 320 and the NFC recognition module 330.

As described above, the NFC recognition module 330 serves to receive a one-time keypad from the input terminal 100. Representative examples of the NFC recognition module 330 may include an NFC module installed in a smart phone.

The controller 320 outputs the one-time keypad received from the NFC recognition module 330 through the display module 310.

Representative examples of the display module 310 may include an output window installed in a smart phone.

Hereafter, a security key input method using the output terminal according to the first embodiment of the present invention will be described in detail with reference to the accompanying drawings.

Figure 3:
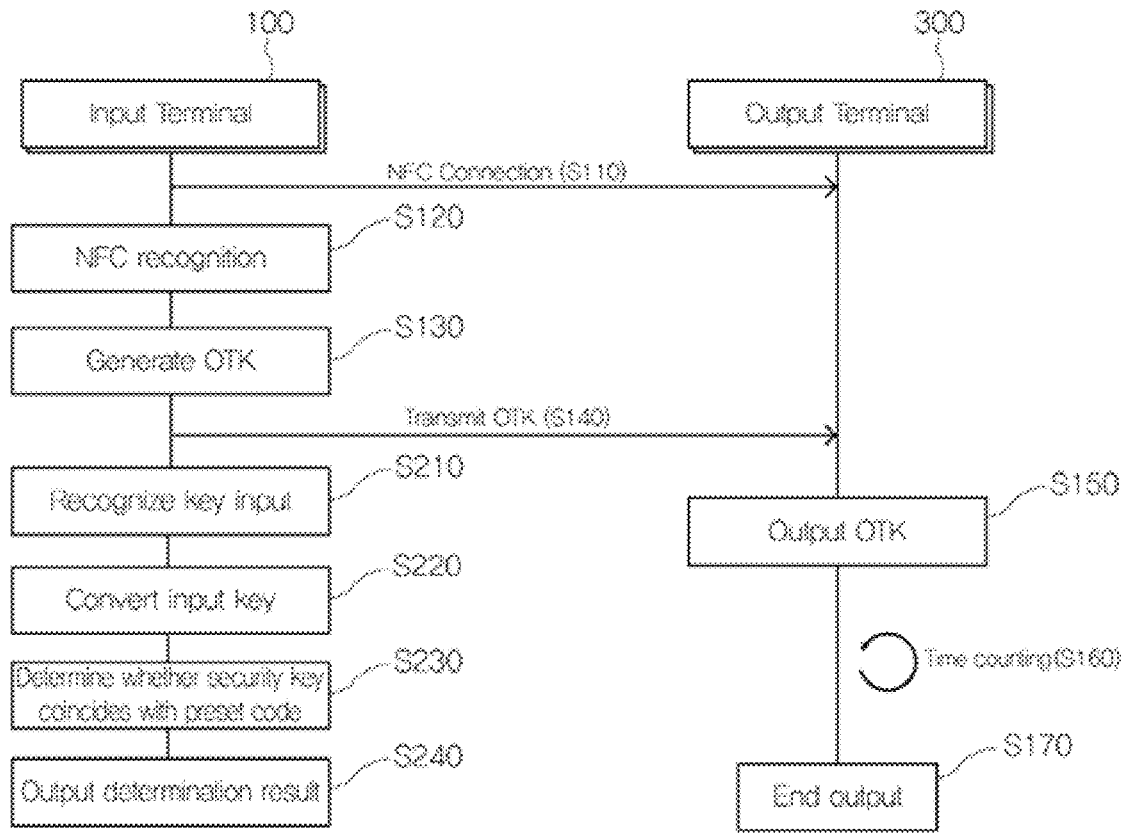
FIG. 3 is a flowchart illustrating a security key input method using a one-time keypad according to the first embodiment of the present invention.
Figure 4:
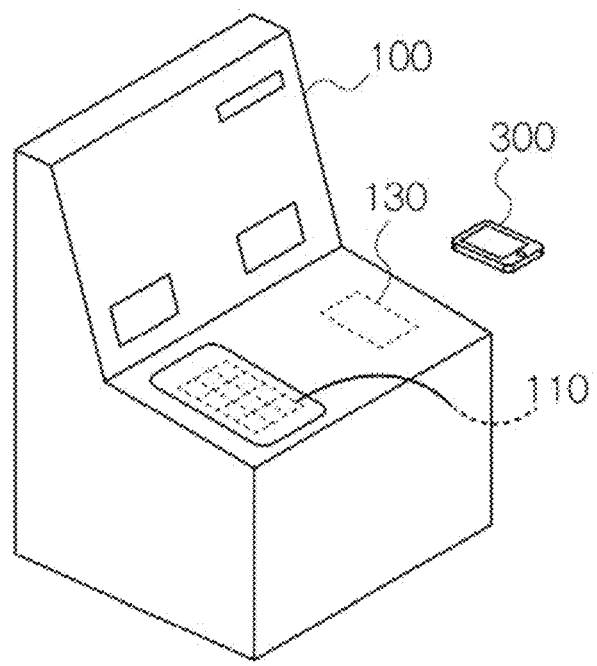
FIG. 4 is a diagram illustrating an example of an input terminal and an output terminal which form the security key input system according to the first embodiment of the present invention.
Figure 5:
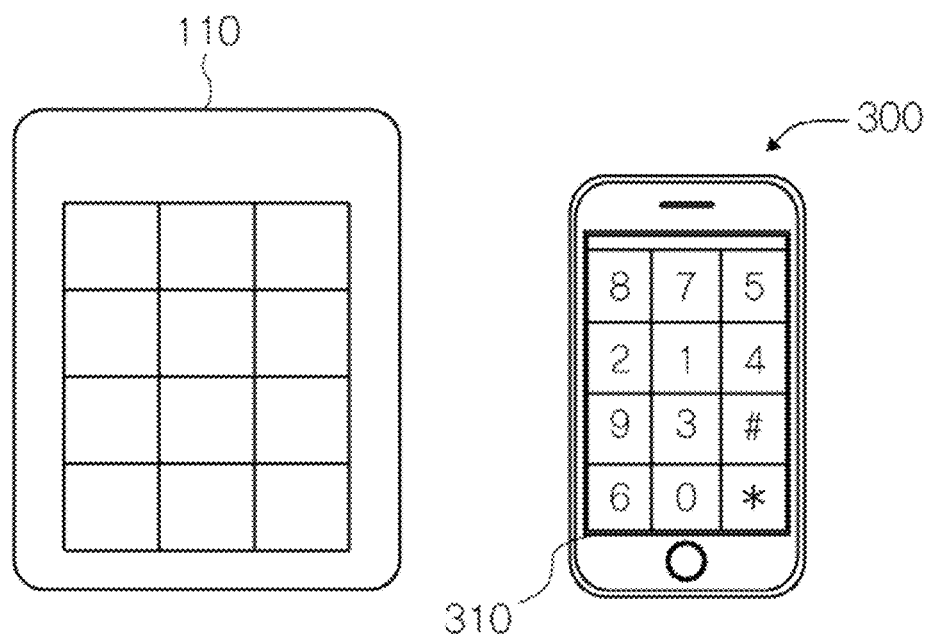
FIG. 5 is a diagram illustrating an example in which a one-time keypad is provided by the security key input system according to the first embodiment of the present invention.

FIG. 3 is a flowchart illustrating a security key input method using a one-time keypad according to the first embodiment of the present invention, FIG. 4 is a diagram illustrating an example of the input terminal and the output terminal which form the security key input system according to the first embodiment of the present invention, and FIG. 5 is a diagram illustrating an example in which a one-time keypad is provided by the security key input system according to the first embodiment of the present invention.

As illustrated in FIG. 4, the security key input method using a one-time keypad according to the first embodiment of the present invention is started from step S110 in which a user brings the output terminal 300 into contact with the input terminal 100, when the user is intended to input a security key.

That is, when the input terminal 100 is an ATM as illustrated in FIG. 4, the user inserts a card to select a desired transaction and inputs a security key to the input terminal 100. In this case, the user brings the output terminal 300 into contact with the NFC recognition unit 130 installed in the input terminal 100.

When the NFC recognition module 330 of the output terminal 300 is recognized at step S120, the input terminal 100 generates a one-time keypad at step S130.

At this time, the one-time keypad refers to a one-time keypad of which the key arrangement is randomly set.

Then, the generated one-time keypad is transmitted to the output terminal 300 through NFC at step S140.

The output terminal 300 receiving the one-time keypad outputs the one-time keypad through the display module 310 at step S150, as illustrated in FIG. 5.

As illustrated in FIG. 5, the one-time keypad is a one-time input keypad of which the key arrangement is modified.

The output terminal 300 counts the time at step S160, and ends the output of the one-time keypad at step S170 after outputting the one-time keypad during a preset time.

The input terminal 100 having outputted the one-time keypad to the output terminal 300 outputs a security keypad to the keypad input unit 110, and receives a security key from the user. The security keypad is a keypad displaying only divided regions.

That is, as illustrated in FIG. 5, only a key input window (security keypad) which has no numbers or symbols is outputted to the input terminal 100, and the user checks the one-time keypad through the output terminal 300 and inputs a security key through the keypad input unit 110.

Hereafter, the keys of the key input window which has no numbers or symbols will be referred to as null keys.

When the input of the security key from the user is recognized, the input terminal 100 reads (converts) the input security key according to the arrangement of the generated one-time keypad, at steps S210 and 220.

Then, the input terminal 100 determines whether the input security key coincides with a preset code, at step S230.

At this time, the preset code indicates a preset password. In the case of an ATM, when a user's card is inserted, the password of the card is read. In the case of a door lock, the preset code corresponds to a preset password of the door lock. In the case of a computer terminal, the preset code corresponds to a password set on a website which needs to authenticate a user.

The input terminal 100 outputs the determination result indicating whether the input security key coincides with the preset code, at step S240.

The operation of determining whether the input security key coincides with the preset code may be performed on each digit of the security key or performed after all the digits of the security key with a preset length are inputted.

At this time, the output of step S240 may be performed through a display or sound. For example, when the input security key coincides with the preset code, the position of the input security key is outputted in a specific color (green), and when the input security key does not coincide with the preset code, the position of the input security key is outputted in another color (red). Then, the user can immediately recognize whether the key input is correct or wrong.

Hereafter, a security key input system according to another embodiment for the first embodiment of the present invention will be described with reference to the accompanying drawings.

The security key input system according to the embodiment for the first embodiment of the present invention transmits a one-time keypad generated through the input terminal to the output terminal through SMS (Short Message Service) or MMS (Multimedia Messaging Service) message, without using NFC.

Figure 6:
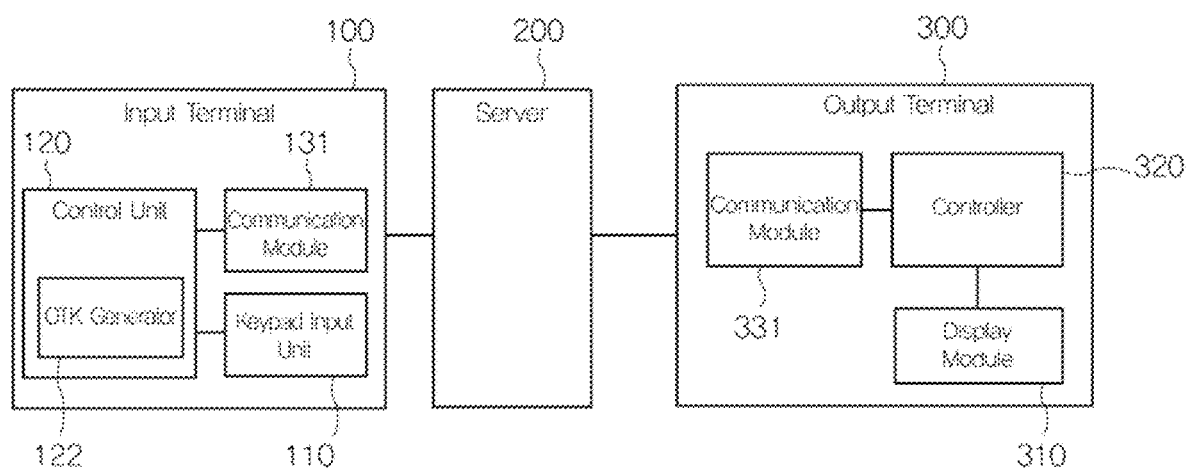
FIG. 6 is a block diagram illustrating a security key input system using a one-time keypad according to another embodiment for the first embodiment of the present invention.

For this operation, the security key input system according to the embodiment for the first embodiment of the present invention includes an input terminal 100 and an output terminal 300 as illustrated in FIG. 6.

The input terminal 100 includes a keypad input unit for receiving a security key.

As illustrated in FIG. 6, the security key input system using a one-time keypad according to the present embodiment includes the input terminal 100, a server 200 and the output terminal 300.

The input terminal 100 receives a security key and determines whether to disable the security. For this operation, the input terminal 100 includes a keypad input unit 110, a control unit 120 and a communication module 131.

The keypad input unit 110 is an input window installed in the input terminal 100. Desirably, a display device provided with a touch panel may be applied as the keypad input unit 110.

At this time, the communication module 131 is connected to the server 200 through wired/wireless communication, and transmits a generated one-time keypad to the output terminal 300. In general, a wired communication module is applied, but a wireless communication module such as Wi-Fi can be applied according to the installation place and environment.

The control unit 120 generates a one-time keypad, provides the generated one-time keypad to the output terminal 300, and determines whether a security key inputted from a user through the keypad input unit 110 coincide with a preset code. For this operation, the control unit 120 includes a one-time keypad generator 122.

The one-time keypad generator 122 generates a keypad of which the key arrangement is randomly set (refer to FIG. 5). Whenever a user inputs a security key, the one-time keypad generator 122 generates a new one-time keypad, and provides the generated one-time keypad to the output terminal 300.

The control unit 120 transmits the one-time keypad generated through the one-time keypad generator 122 to the output terminal 300 through the server 200. Desirably, the control unit 120 may transmit the one-time keypad in the form of SMS or MMS message.

For this operation, the control unit 120 may convert the generated one-time keypad into an SMS or MMS message.

The control unit 120 generates a security keypad using the generated one-time keypad, and outputs the security keypad through the keypad input unit 110.

At this time, the security keypad has the same key arrangement as the one-time keypad. As illustrated in FIG. 5, however, the security keypad is an input window of which the respective keys are expressed as null keys having no numbers or symbols written thereon and which displays only the divided regions thereof. Thus, although the user's inputting the security key onto the security keypad is exposed, the input security key is not exposed.

The security keypad may be configured according to various embodiments.

According to another embodiment of the security keypad, the security keypad may output an input window of which the numbers or symbols are partially written. Thus, a user can easily recognize the arrangement of the one-time keypad displayed on the output terminal 300 while matching the one-time keypad with the security keypad.

At this time, the number of numbers or symbols displayed on the keypad input unit 110 may be set to less than the number of digits forming a preset security key.

That is, when the number of numbers or symbols displayed on the keypad input unit 110 is equal to or more than the number of digits forming the preset security key, all digits of the security key to be inputted by the user are likely to be displayed on the keypad input unit 110. Thus, the number of numbers or symbols may be set to less than the number of digits forming the preset security key.

For example, suppose that the security keys are set to four digits in the case of an input window including 12 regions. In this case, the probability that all of the security keys to be inputted will be displayed on the keypad input unit 110 is approximately 1/11880. In order to prevent such a situation, the number of numbers or symbols displayed on the keypad input unit 110 may be set to less than the preset number of security keys.

The server 200 receives the one-time keypad from the input terminal 100, and transmits the received one-time keypad to the output terminal 300. The server 200 may include servers of a mobile-service company which provides a text message and various messenger servers on the Internet.

The output terminal 300 outputs the received one-time keypad to a user, and includes a display module 310, a controller 320 and a communication unit 331.

The communication unit 331 receives the one-time keypad from the server 200.

The controller 320 outputs the one-time keypad received from the communication unit 331 through the display module 310.

At this time, the display module 310 may correspond to an output window installed in a smart phone.

Hereafter, a security key input method according to another embodiment for the first embodiment of the present invention will be described in detail with reference to the accompanying drawings.

Figure 7:
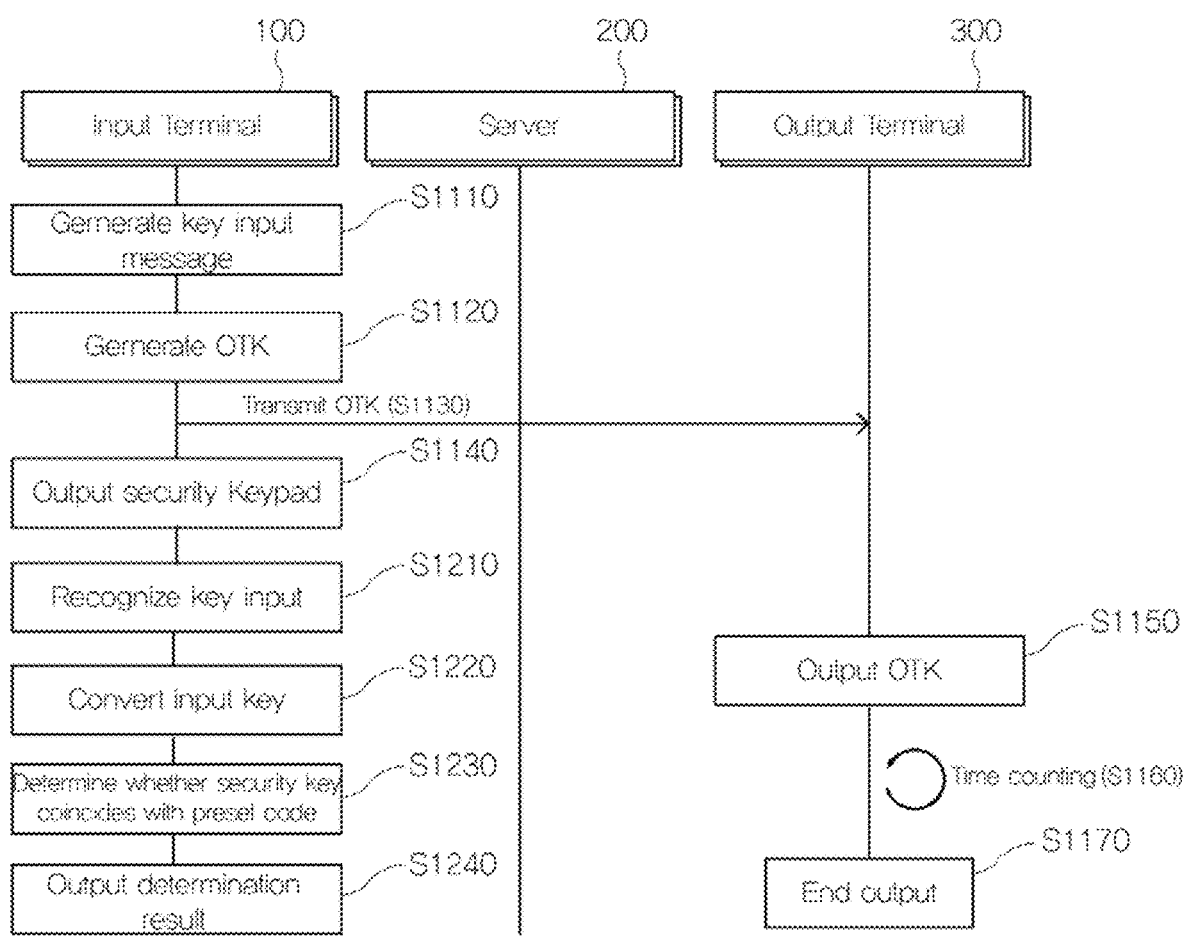
FIG. 7 is a flowchart illustrating a security key input method using a one-time keypad according to another embodiment for the first embodiment of the present invention.

FIG. 7 is a flowchart illustrating a security key input method using a one-time keypad according to a specific embodiment of the present invention.

As illustrated in FIG. 7, the security key input method using a one-time keypad according to the specific embodiment of the present invention is started from step S1110 in which the input terminal 100 generates a key input message.

When the key input message is generated, the one-time keypad generator 122 generates a one-time keypad at step S1120.

As described above, the one-time keypad refers to a keypad of which the key arrangement is randomly set.

Then, the input terminal 100 converts the generated one-time keypad into an SMS or MMS message, and transmits the SMS or MMS message to the output terminal 300 through the server 200, at step S1130.

At this time, the unique number of the output terminal 300, for example, the phone number needs to be previously stored in the input terminal.

The input terminal 100 having transmitted the one-time keypad generates a security keypad from the one-time keypad, and outputs the generated security keypad to the keypad input unit 110, at step S1140.

At this time, the security keypad may be configured as described above.

The output terminal 300 receiving the one-time keypad outputs the received one-time keypad through the display module 310 at step S1150.

The output of the one-time keypad may be performed during a process in which a user checks the received SMS or MMS message.

The controller 320 of the output terminal 300 having outputted the one-time keypad counts the time at step S1160, and ends the output of the one-time keypad after outputting the one-time keypad during a preset time, at step S1170.

At this time, since the one-time keypad is used only once, the controller 320 may delete the received SMS or MMS message when the output of the one-time keypad is ended.

The input terminal 100 having outputted the security keypad receives a security key from the user at step S1210.

When the input of the security key from the user is recognized, the input terminal 100 reads (converts) the security key according to the arrangement of the generated one-time keypad, at steps S1220.

Then, the input terminal 100 determines whether the input security key coincides with a preset code, at step S1230.

The input terminal 100 outputs the determination result indicating whether the input security key coincides with the preset code, at step S1240.

Figure 8:
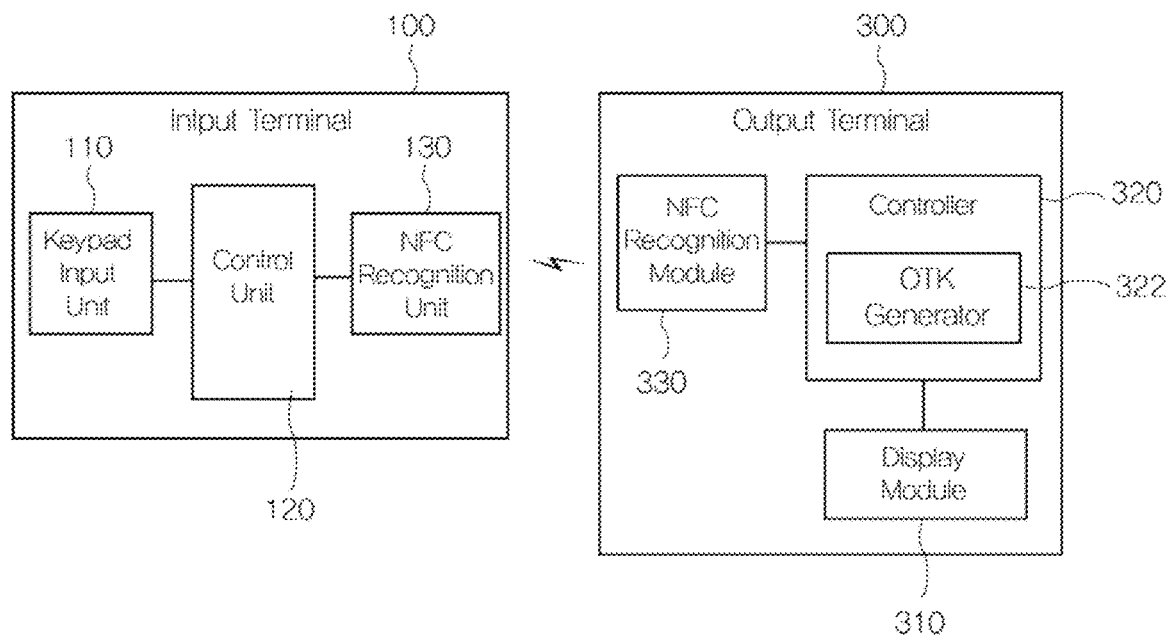
FIG. 8 is a block diagram illustrating a security key input system using a one-time keypad according to a second embodiment of the present invention.

FIG. 8 is a block diagram illustrating a security key input system using a one-time keypad according to a second embodiment of the present invention.

The security key input system using a one-time keypad according to the second embodiment of the present invention generates a one-type keypad through an output terminal. As illustrated in FIG. 8, the security key input system includes an input terminal 100 and an output terminal 300.

The input terminal 100 includes a keypad input unit 110, a control unit 120 and an NFC recognition unit 130.

Hereafter, the duplicated descriptions of components which perform the same functions as those of the above-described embodiment are omitted herein.

The NFC recognition unit 130 receives the one-time keypad generated by the output terminal 300 through NFC with an NFC recognition module 330 installed in the output terminal 300 contacted with the NFC recognition unit 130.

The output terminal 300 includes a display module 310, a controller 320 and an NFC recognition module 330.

As described above, the NFC recognition module 330 transmits a one-time keypad to the input terminal 100.

At this time, the controller 320 includes a one-time keypad generator 322 for generating a one-type keypad.

The one-time keypad generator 322 serves to generate a keypad of which the key arrangement is randomly set. According to a generation command from a user, the one-time keypad generator 322 generates and provides a new one-time keypad.

The controller 320 outputs the one-time keypad generated through the one-time keypad generator 322 through the display module 310.

Figure 9:
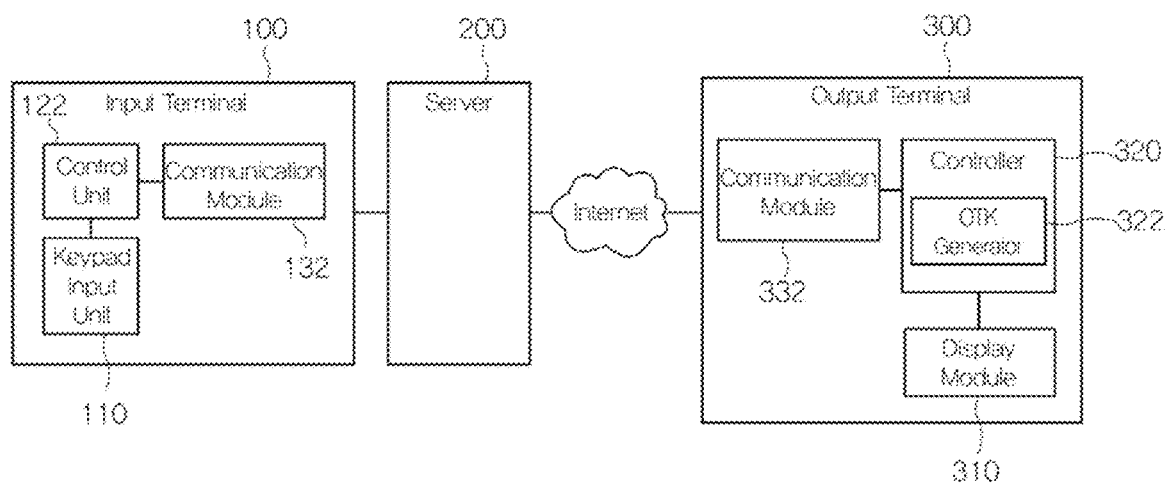
FIG. 9 illustrates a security key input system according to another embodiment for the second embodiment of the present invention.

FIG. 9 illustrates a security key input system according to another embodiment for the second embodiment of the present invention. As illustrated in FIG. 9, the security key input system includes an input terminal 100, a server 200 and an output terminal 300.

The security key input system according to the embodiment of FIG. 9 includes an output terminal provided with no NFC module, and a one-time keypad generated through the output terminal 300 is provided to the input terminal 100 through the server 200.

For this operation, the input terminal 100 includes a keypad input unit 110, a control unit 122 and a communication module 131.

The keypad input unit 110 is an input window installed in the input terminal 100, and the control unit 122 receives a one-time keypad through the server 200 to be described later, and determines whether a security key inputted from a user through the keypad input unit 110 coincides with a preset code.

The communication module 131 is a communication module which connects the input terminal 100 to the server 200 through a network, and wireless communication such as Wi-Fi can be applied in addition to general wired communication.

The server 200 transmits the one-time keypad generated through the output terminal 300 to the input terminal 100. When the input terminal can be given a separate communication address and perform independent communication, the server 200 may be omitted.

The output terminal 300 includes a display module 310, a controller 320 and a communication unit 331.

The communication unit 331 is connected to the server 200 through a network, and provides a one-time keypad generated by the controller 320 to the input terminal 100.

The controller 320 includes a one-time keypad generator 322. The controller 320 generates a one-time keypad through the one-time keypad generator 322, and outputs the generated one-time keypad through the display module 310.

Hereafter, the one-time keypad and the security keypad will be described in detail.

The one-time keypad is a keypad of which the key arrangement is randomly set by a random algorithm. The one-time keypad is generated as a one-time element and then disappears.

For example, suppose that the one-time keypad is a general 4-by-3 keypad. In this case, 1 to # are not sequentially arranged for the respective input keys, but random input commands may be arranged for the respective input keys.

The one-time keypad may be generated by a specific input command of the user.

That is, as illustrated in FIG. 10, a specific shape of touch input (circle) may be inputted to a keypad input window or a specific shape of motion (shaking) may be inputted to generate a keypad of which the input keys are shuffled.

As described above, the one-time keypad may be generated through a random algorithm, but generated through an arbitrary operation of the user.

That is, as illustrated in FIG. 11, the user may drag and change the positions of the input keys in the basic keypad state, thereby generating a desired one-time keypad.

Thus, the user can use a one-time keypad with a preferred key arrangement. The one-time keypad generated by the user may be stored in the output terminal during a predetermined period or until the user changes the one-time keypad.

At this time, 'one time' of the one-time keypad does not indicate that the keypad arrangement is changed whenever the one-time keypad is used, but indicates that the keypad arrangement is changed after the predetermined period.

Figure 12:
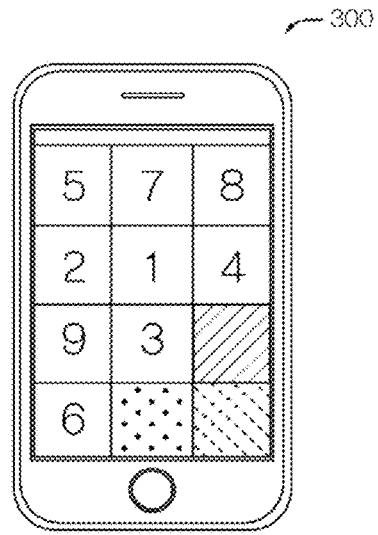
FIG. 12 is a diagram illustrating an example of a one-time keypad which is applied to the security key input system and method according to the embodiment of the present invention.

The one-time keypad may include number keys and symbol keys such as * and #, like a general keypad. As illustrated in FIG. 12, however, the one-time keypad may include number keys and color keys.

Referring to FIG. 12, colors are distinguished by a difference between shaded areas, due to the characteristic of a patent specification.

As described above, the keypad may be configured in the form of a general 4-by-3 keypad. However, the arrangement of the keypad can be expanded to improve the security.

That is, when a security key is inputted in a general case, a user needs to increase the length of the security key in order to improve the security. In this case, the user may feel inconvenience because the user has difficulties in memorizing the security key. However, the security key input system according to the present embodiment can expand the size of the keypad while a security key with a predetermined length is maintained, thereby improving the security. Thus, the user may have no inconvenience while the security is reinforced.

The security keypad outputted to the input terminal 100 has the same arrangement as the one-time keypad as illustrated with reference to FIG. 5, but indicates a keypad from which identification marks are removed.

Hereafter, a security key input method according to the second embodiment of the present invention will be described in detail with reference to the accompanying drawings.

Figure 13:
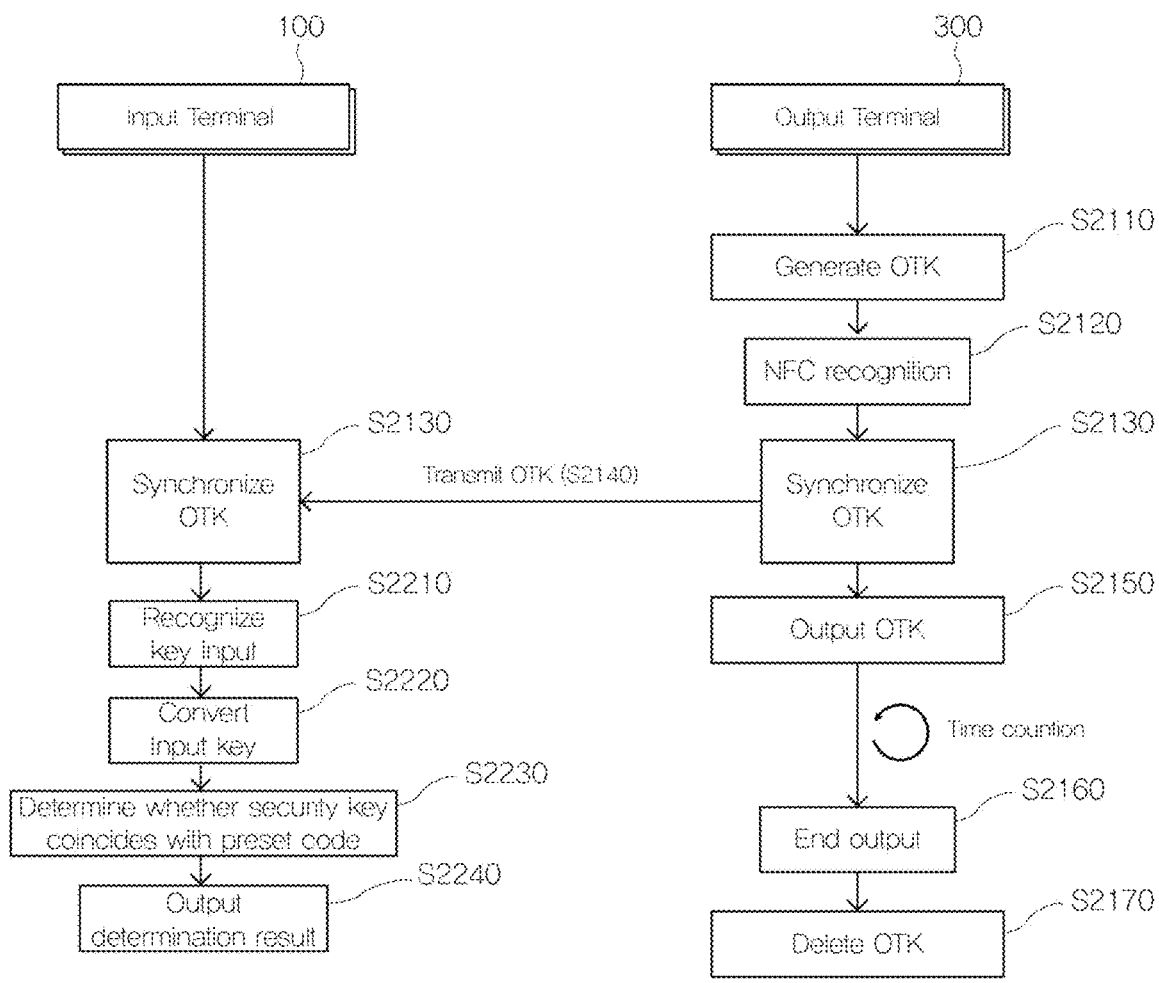
FIG. 13 is a flowchart illustrating a security key input method according to the second embodiment of the present invention.

FIG. 13 is a flowchart illustrating a specific embodiment of the security key input method according to the second embodiment of the present invention.

As illustrated in FIG. 13, the security key input method according to the second embodiment of the present invention is started from step S2110 at which a user generates a one-time keypad through the output terminal 300.

At this time, the one-time keypad may be randomly generated in a state where the input keys of the one-time keypad are shuffled by a command input from the user, or generated in a state where the inputs keys of the one-time keypad are arbitrarily arranged by the user.

When the one-time keypad generated through the arrangement manipulation of the user is stored, the one-time keypad can be read and used.

Then, the user brings the output terminal 300 into contact with the input terminal 100 such that NFC is recognized, at step S2120.

When the input terminal 100 and the output terminal 300 are connected through NFC, the one-time keypad generated by the output terminal 300 is transmitted to the input terminal 100 through the NFC, and the one-time keypad is synchronized therebetween, at steps S2130 and S2140.

According to another embodiment of the present invention, the one-time keypad may be transmitted through the Internet by the communication unit 331 and the communication module 131 without a contact between the input terminal 100 and the output terminal 300.

Then, the output terminal 300 outputs the generated one-time keypad through the display module 310 at step S2150.

The output terminal 300 counts the time, and ends the output of the one-time keypad after outputting the one-time keypad during a preset time, at step S2160.

After the output of the one-time keypad is ended, the one-time keypad may be deleted at step S2170.

The input terminal 100 receiving the one-time keypad from the output terminal 300 outputs an input window to the keypad input unit 110, the input window being provided as a security keypad having no numbers or symbols written thereon, and receives a security key from the user, at step S2210.

That is, an input window having no numbers or symbols written thereon is outputted in the form of a security keypad to the input terminal 100, and the user checks the one-time keypad through the output terminal 300 and inputs a security key through the keypad input unit 110.

When the input of the security key from the user is recognized, the input terminal 100 reads (converts) the input security key according to the arrangement of the generated one-time keypad, at step S2220.

Then, the input terminal 100 determines whether the input security key coincides with a preset code, at step S2230.

The input terminal 100 outputs the determination result indicating whether the input security key coincides with the preset code, at step S2240.

Hereafter, still another embodiment for the second embodiment of the present invention will be described.

Figure 14:
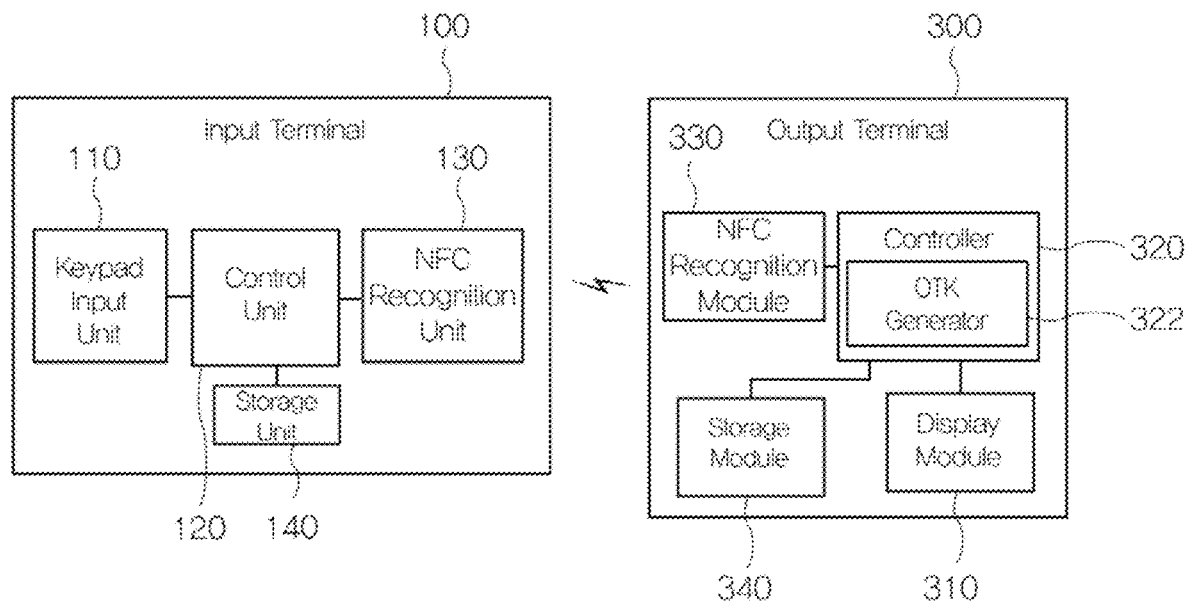
FIG. 14 is a block diagram illustrating a security key input system according to still another embodiment for the second embodiment.

FIG. 14 is a block diagram illustrating a security key input system according to still another embodiment for the second embodiment of the present invention.

As illustrated in FIG. 14, the security key input system according to the embodiment for the second embodiment of the present invention includes a storage unit 140 and a storage module 340 which are installed in the input terminal 100 and the output terminal 300, respectively.

According to the embodiment for the second embodiment of the present invention, the output terminal 300 generates a one-time keypad and shares the one-time keypad with the input terminal 100 through recognition by NFC, and the one-time keypad is stored in the storage unit 140 and the storage module 340, respectively.

More specifically, the operation of the security key input system is started from a step at which the output terminal 300 recognizes the input terminal 100 through NFC.

Then, the output terminal 300 generates a one-time keypad through the one-time keypad generator 322, and transmits the generated one-time keypad to the input terminal through NFC.

At this time, the one-time keypad may be generated by a command from a user, and shared through NFC.

The one-time keypad is stored in the storage unit 140 of the input terminal 100 and the storage module 340 of the output terminal 300.

Then, when the user inputs a security key through the keypad input unit 110 of the input terminal 100 in order to disable the security, the one-time keypad stored in the storage unit 140 is deleted and disappears.

When a new one-time keypad is generated in the output terminal 300 through an input command of the user or NFC recognition, the generated one-time keypad is stored in the storage unit 140 of the input terminal 100 through NFC, and the storage state is maintained until the security is canceled by the security key input of the user.

According to the embodiment for the second embodiment of the present invention, the security key input system can overcome a time difference between when a one-time keypad is generated and when a security key is inputted and a spatial difference between the input terminal 100 and the output terminal 300.

That is, once a one-time keypad is generated and stored in the input terminal 100 and the output terminal 300, a user can input a one-time security key through a help of another user carrying the output terminal 300, even when a time difference exists and the user does not carry an output terminal.

As such, the security key input system according to the embodiment for the second embodiment of the present invention may exhibit high effectiveness when a door lock is applied as the input terminal 100.

For example, when a holder (for example, house owner) of the output terminal 300 has gone out after a one-time keypad was already generated and stored in the input terminal 100 and the output terminal 300, a situation in which an unlock of the door lock must approved as a one-time event for others may occur. For example, a real state agent may want to visit the house after the house owner has gone out. In this case, the holder of the output terminal 300 may inform the real state agent of only the input position and order of the security key, such that the security of the door lock is disabled.

In this case, since the stored one-time keypad disappears after the security of the door lock is disabled, the security cannot be disabled even though a security key is inputted through the same positions, which makes it possible to reduce the possibility that a password will be leaked to others.

The specific embodiment of the present invention and still another embodiment of the present invention may be combined.

That is, according to the specific embodiment of the present invention and still another embodiment of the present invention, the output terminal 300 and the input terminal 100 may be used for generating a one-time keypad to receive a security key. Furthermore, the output terminal 300 and the input terminal 100 may generate a separate one-time keypad and store the generated one-time keypad in the storage unit 140 and the storage module 340. Only when a user needs to allow an access of another person from a remote place, the user may inform the person of the input position and order of the security key through the stored one-time keypad.

In this case, after the security is disabled, the one-time keypad stored in the storage unit 140 is deleted.

The detailed configurations of the security key input system may be modified according to a target device of the input terminal.

For example, the input terminal may include a computer terminal.

In this case, the keypad input unit may correspond to a display device (monitor) and a human interface device (mouse or the like) which are applied to the computer terminal, and the one-time keypad generated by the output terminal may be shared with the computer terminal through wired/wireless communication.

Furthermore, when the input terminal is provided with a separate output device, the security key input system may not include the output terminal.

For example, when the input terminal is an ATM, the input terminal includes a control unit and an output unit, the control unit including a one-time keypad generator.

The one-time keypad generator generates a one-time keypad whenever a user inputs a security key, and the output unit prints the generated one-time keypad on an output medium such as printing paper and provides the output medium to the user.

That is, when the user needs to input a security key while using the input terminal or the ATM, the input terminal generates a one-time keypad through the one-time keypad generator, prints the generated one-time keypad on a printing paper, and outputs the printing paper through the output unit.

In order to reinforce the security of the security key input system according to the present embodiment, the output unit can output the printing paper such that the surface having the one-time keypad printed thereon faces downward, or discharge the printing paper in the form of a rolled paper such that others cannot recognize the printing paper having the one-time keypad printed thereon.

Then, the input terminal outputs a security keypad having no identification marks written thereon to the keypad input unit. According to the one-time keypad printed on the printing paper, the user inputs keys onto the security keypad, the keys being located at positions corresponding to the password (security key) of the user.

Therefore, the user can input the security key using the one-time keypad even though the user does not hold a separate output terminal.

The embodiment of the present invention may be applied to not only ATM, but also various devices such as door lock and safe as long as the devices are provided with output means.

Hereafter, a security key input system using a one-time keypad according to a third embodiment of the present invention will be described in detail with reference to the accompanying drawings.

In the security key input system using a one-time keypad according to the third embodiment of the present invention, an input terminal and an output terminal share a one-time keypad synchronized through a time synchronization method.

Figure 15:
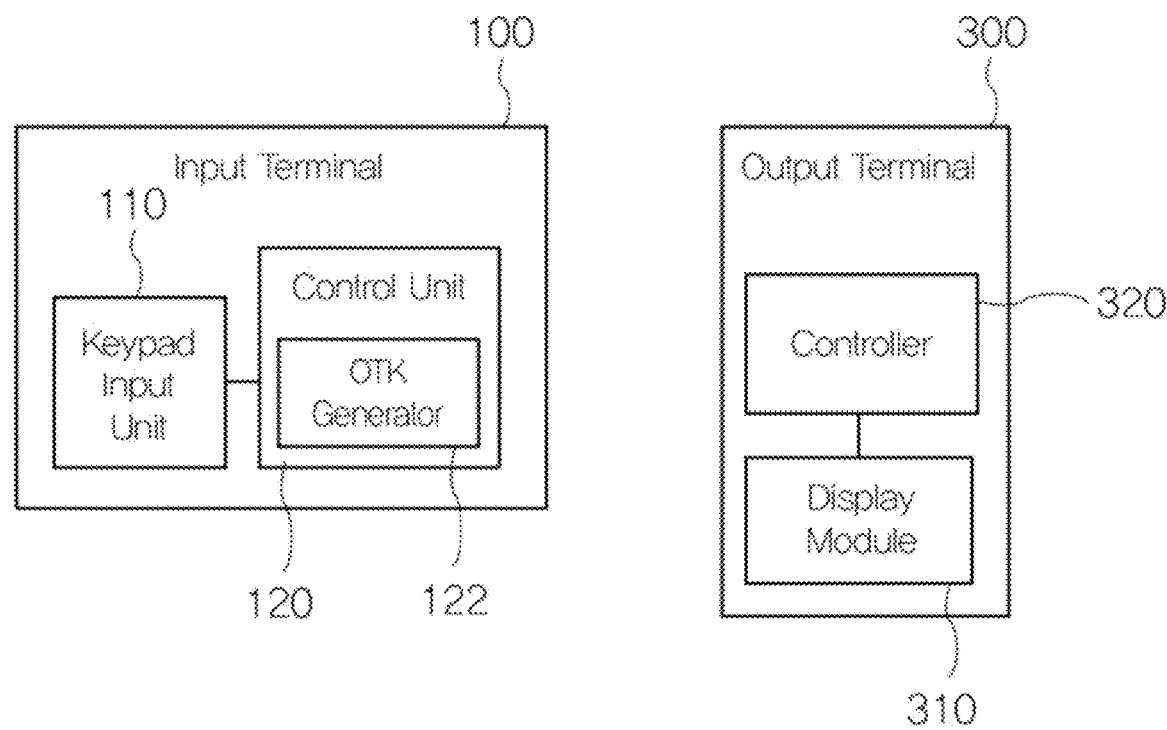
FIG. 15 is a block diagram illustrating a security key input system according to a third embodiment of the present invention.
Figures 16, 17:
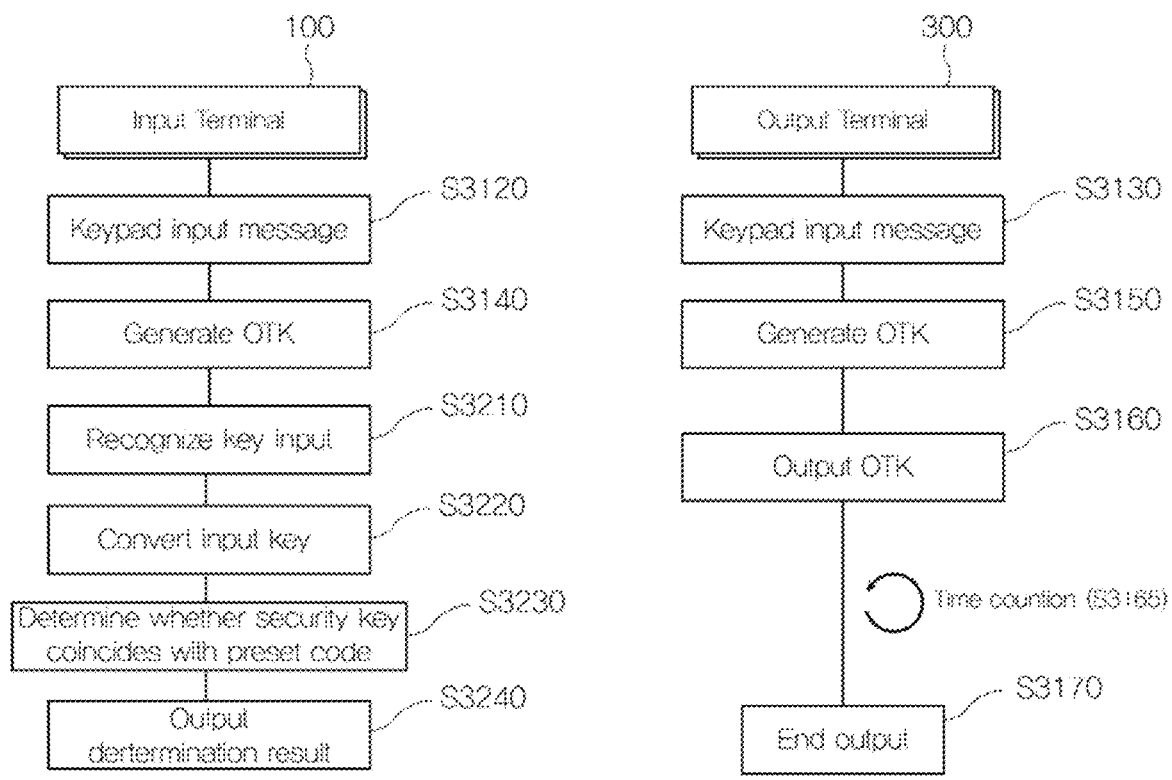
FIG. 16 is a block diagram illustrating an example in which a one-time keypad is provided by the security key input system according to the third embodiment of the present invention.
FIG. 17 is a flowchart illustrating a security key input method according to the third embodiment of the present invention.

FIG. 15 is a block diagram illustrating the security key input system according to the third embodiment of the present invention, and FIG. 16 is a block diagram illustrating an example in which a one-time keypad is provided by the security key input system according to the third embodiment of the present invention.

As illustrated in FIG. 15, the security key input system using a one-time keypad according to the third embodiment of the present invention includes an input terminal 100 and an output terminal 300.

The input terminal 100 includes a keypad input unit 110 and a control unit 120.

The keypad input unit 110 is an input window installed in the input terminal 100, and the input terminal 100 receives a security key from a user through the keypad input unit 110.

The control unit 120 includes a one-time keypad generator 122 for generating a one-type keypad.

The one-time keypad generator 122 serves to generate a keypad of which the key arrangement is randomly set. Whenever a user inputs a security key, the one-time keypad generator 122 generates and provides a new one-time keypad.

The output terminal 300 includes a display module 310 and a controller 320.

The controller 320 generates a one-time keypad synchronized with the one-time keypad generated by the one-time keypad generator 122 or generates the same one-time keypad as the one-time keypad generated by the one-time keypad generator 122, and outputs the generated one-time keypad through the display module 310. The principle that the one-time keypad generator 122 and the controller 320 generate the synchronized one-time keypad will be described later with reference to FIG. 16.

The terminal may include a general smart phone or a dedicated terminal for providing a one-time keypad.

The control unit 120 outputs the generated one-time keypad to the keypad input unit 110. At this time, the control unit 120 outputs the one-time keypad in the form of a security keypad having null keys of which the identification marks are not written.

The controller 320 outputs a one-time keypad having a modified arrangement in the form of a keypad including identification marks written thereon, through the display module 310.

Hereafter, the process in which the one-time keypad generator 122 and the controller 320 generate a synchronized one-time keypad will be described.

First, the one-time keypad generator 122 of the control unit 120 and the controller 320 share the same key. At this time, the key may be shared through a separate registration procedure.

When the one-time keypad is generated, an arrangement key is generated through the shared key and a synchronization key which is generated according to the point of time that the one-time keypad is generated (hereafter, referred to as generation time). At this time, the arrangement key generation algorithm may include various encoding algorithms as well as simple calculation.

Thus, the one-time keypad generator 122 and the controller 320 generate the same arrangement key when the generation times of the one-time keypads coincide with each other.

In order to overcome a difference in the generation time between the one-time keypads, the synchronization key may be generated at each predetermined unit time (for example, minute).

The synchronization key may be generated according to a generation order based on the generation time.

That is, the synchronization key may be generated according to the generation order at each predetermined unit time. For example, when the predetermined unit time is one hour, the synchronization key may be generated according to the generation order which is reset at each hour.

Thus, when an equal number of synchronization keys are generated within a preset time, the input terminal and the output terminal can generate the same synchronization key.

Thus, when the predetermined unit time is set to a large value, the possibility that an error will occur according to the generation times of the one-time keypads may be reduced. However, when an error occurs, a long waiting time may be required until the generation count is reset. On the other hand, when the predetermined unit time is set to a small value, the possibility that an error will occur according to the generation times of the one-time keypads may be increased. However, when an error occurs, a short time may be required for resetting the generation count.

The arrangement key may be generated according to the number system corresponding to the number of divided regions included in a one-time keypad to be generated.

That is, when the number of divided regions included in the one-time keypad is 12 (4 by 3), the arrangement key may be generated as a duodecimal value, and when the number of divided regions included in the one-time keypad is 9 (3 by 3), the array keys may be generated as a nonary value.

That is in order to prevent matching units from remaining or falling short, when the one-time keypad is generated through the arrangement key.

The one-time keypad generator 122 and the controller 320 generate a one-time keypad using the generated arrangement key.

The one-time keypad may be generated by matching the arrangement key with preset keypad positions.

For example, suppose that the arrangement key is generated as '8757214493B560BA81' according to the duodecimal number system, as illustrated in FIG. 16. In this case, the matching is sequentially performed as follows: a matching unit '8' is matched with region (1, 1) of the one-time keypad, a matching unit '7' is matched with region (1, 2) of the one-time keypad, and a matching unit '5' is matched with region (1, 3) of the one-time keypad.

At this time, the matching unit '7' needs to be matched with region (2, 1). However, since the matching unit '7' is already matched with region (1, 2), the next matching unit '2' of the arrangement key is matched with region (2, 1).

In this way, when all regions of the one-time keypad are matched, the one-time keypad may be generated.

At this time, the one-time keypad matching algorithm using the arrangement key may be modified in various manners. For example, the matching order may be set in inverse order of the arrangement key, and only the odd-numbered or even-numbered matching units of the arrangement key may be used.

The matching process may be performed in a state where one of the regions included in the one-time keypad is excluded, and a remaining matching unit may be matched with the last one region.

The one-time keypad generator 122 and the controller 320 may generate one-time keypads corresponding to the number of security keys to be inputted. Whenever one security key is inputted, the one-time keypad generator 122 and the controller 320 may provide a different one-time keypad to improve the security level.

Hereafter, a security key input method using a one-time keypad according to the third embodiment of the present invention will be described in detail with reference to the accompanying drawings.

FIG. 17 is a flowchart illustrating a specific example of the security key input method according to the third embodiment of the present invention.

As illustrated in FIG. 17, the security key input method using a one-time keypad according to the third embodiment of the present invention is started from steps S3120 and S3130 at which a keypad input message is generated in the input terminal 100 and the output terminal 300.

At this time, the keypad input message indicates a message for generating a one-time keypad. In the case of the input terminal 100, the keypad input message may be automatically generated during a series of operations. That is, when the input terminal is an ATM, the keypad input message may be generated at a step in which a user inputs a security key (password). When the input terminal is a door lock, the keypad input message may be generated at a step in which a user inputs a security key (password) after opening the cover of the door lock.

In the case of the output terminal 300, the keypad input message may be generated when a user inputs a specific key onto the output terminal 300.

When the keypad input message is generated in the input terminal 100 and the output terminal 300, the one-time keypad generator 122 of the input terminal 100 and the controller 320 generate a one-time keypad at steps S3140 and 3150.

At this time, the one-time keypad is a keypad of which the key arrangement is randomly set. As described above, the one-time keypad is generated through the shared key and the synchronization key.

That is, an arrangement key is generated through the shared key of the one-time keypad generator 122 and the controller 320 and the synchronization key based on the generation times.

The one-time keypad generator 122 of the input terminal 100 and the controller 320 generate the one-time keypad by matching the matching units of the arrangement key with the divided regions of the one-time keypad, respectively.

As such, the input terminal 100 and the output terminal 300 have the synchronized same one-time keypad.

Then, the output terminal 300 outputs the one-time keypad through the display module 310 at step S3160.

The output terminal 300 counts the time at S3165, and ends the output of the one-time keypad after outputting the one-time keypad during a preset time, at step S3170.

The input terminal 100 outputs an input window having only divided regions displayed thereon to the keypad input unit 110, and receives a security key from the user.

That is, only a key input window having no numbers or symbols written thereon is outputted to the input terminal 100, and the user checks the one-time keypad through the output terminal 300 and inputs a security key through the keypad input unit 110.

When the input of the security key from the user is recognized, the input terminal 100 reads (converts) the input security key according to the arrangement of the generated one-time keypad, at steps S3210 and S3220.

Then, the input terminal 100 determines whether the input security key coincides with a preset code, at step S3230.

At this time, the preset code indicates a preset password. The input terminal 100 outputs the determination result indicating whether the input security key coincides with the preset code, at step S3240.

Hereafter, a security key input system using a one-time keypad according to a fourth embodiment of the present invention will be described with reference to the accompanying drawings.

In the security key input system using a one-time keypad according to the fourth embodiment of the present invention, a server generates a one-time keypad and transmits the generated one-time keypad to an input terminal and an output terminal.

Figure 18:
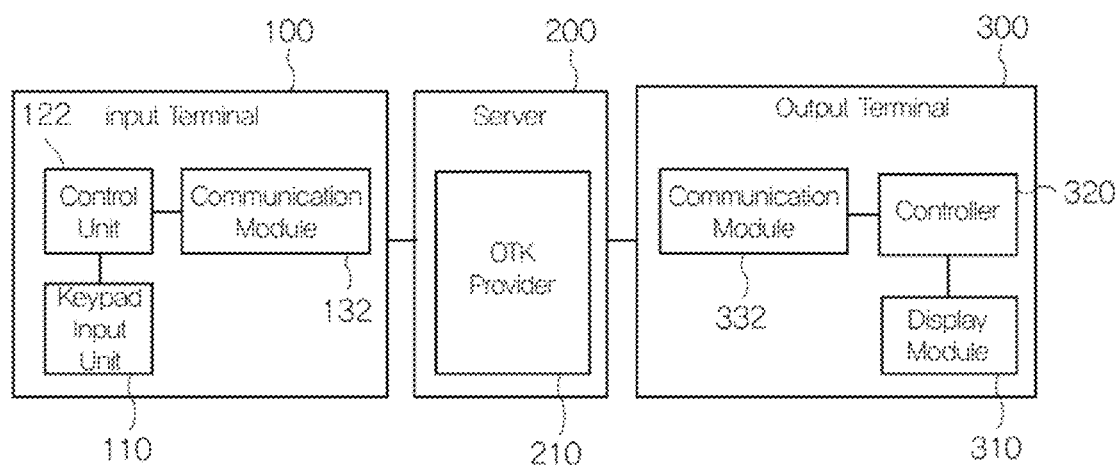
FIG. 18 is a block diagram illustrating a security key input system using a one-time keypad according to a fourth embodiment of the present invention.

FIG. 18 is a block diagram illustrating the security key input system using a one-time keypad according to the fourth embodiment of the present invention.

As illustrated in FIG. 18, the security key input system according to the fourth embodiment of the present invention includes an input terminal 100, a server 200 and an output terminal 300.

The security key input system according to the fourth embodiment of the present invention may include an output terminal with no NFC module, and the server 200 generates a one-time keypad and provides the generated one-time keypad to the input terminal 100 and the output terminal 300.

For this operation, the input terminal 100 includes a keypad input unit 110, a control unit 122 and a communication module 132.

The keypad input unit 110 is an input window installed in the input terminal 100, and the control unit 122 receives a one-time keypad from the server 200 to be described below, and determines whether a security key inputted from a user through the keypad input unit 110 coincides with a preset code.

The communication module 132 is a communication module which connects the input terminal 100 to the server through a network. In general, a wired communication module is applied, but a wireless communication module such as Wi-Fi can be applied according to the installation place and environment.

The server 200 includes a one-time keypad provider 210 for generating a one-type keypad. The one-time keypad provider 210 serves to generate a keypad of which the key arrangement is randomly set. Whenever a user inputs a security key, the one-time keypad provider 210 generates a new one-time keypad and provides the generated one-time keypad to the input terminal 100 and the output terminal 300.

The output terminal 300 includes a display module 310, a controller 320 and a communication unit 332.

The communication unit 332 is connected to the server 200 through a network, and receives a one-time keypad from the server 200.

The controller 320 outputs the one-time keypad received from the communication unit 332 through the display module 310.

Figure 19:
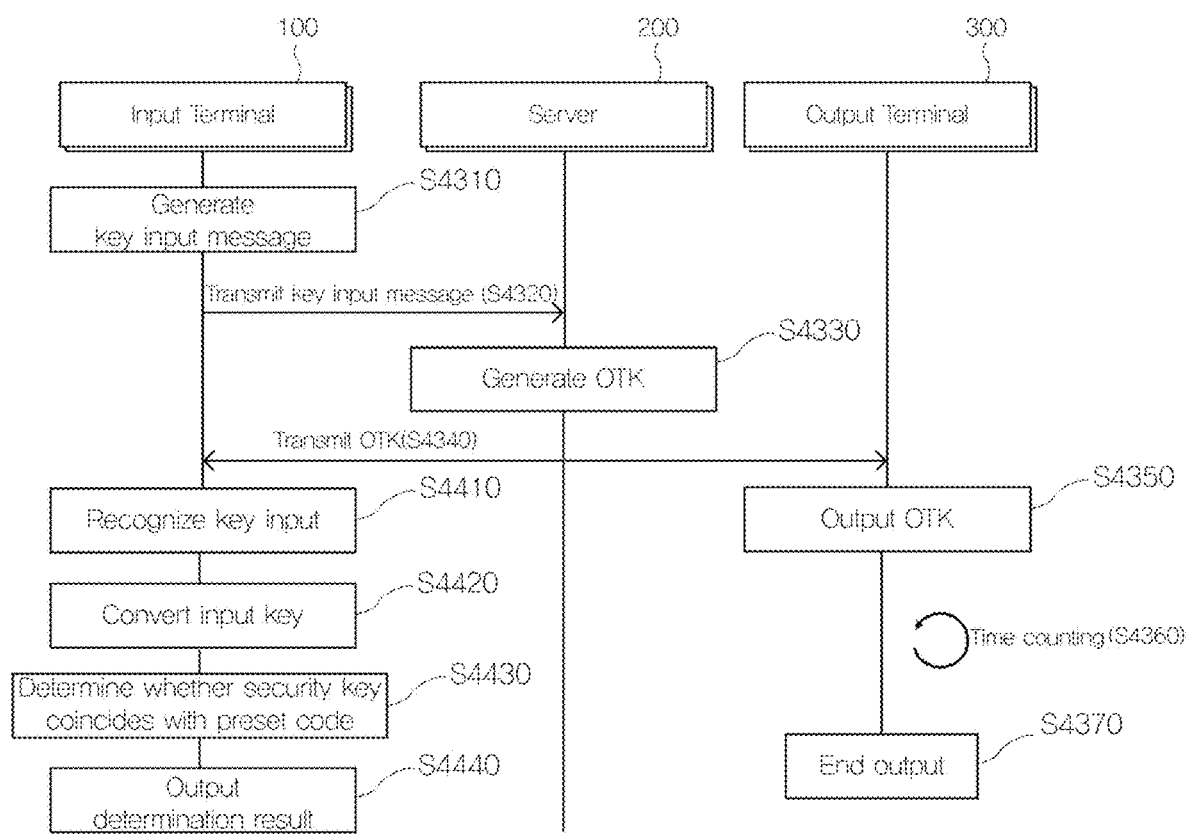
FIG. 19 is a flowchart illustrating a security key input method using a one-time keypad according to the fourth embodiment of the present invention.

FIG. 19 is a flowchart illustrating a security key input method using a one-time keypad according to the fourth embodiment of the present invention.

As illustrated in FIG. 19, the security key input method according to the fourth embodiment of the present invention is started from steps S4310 and S4320 at which the input terminal 100 generates a key input message and transmits the generated key input message to the server 200.

That is, when the input terminal 100 is an ATM, a user inserts a card to select a desired transaction. At a security key input step, the input terminal 100 generates a key input message and transmits the generated key input message to the server 200.

Then, the one-time keypad provider 210 of the server 200 generates a one-time keypad at step S4330.

The server 200 transmits the generated one-time keypad to the input terminal 100 and the output terminal 300 at step S4340.

Then, as described with reference to the above embodiments, the output terminal 300 receiving the one-time keypad outputs the one-time keypad through the display module 310 during a preset time and ends the output of the one-time keypad, at steps S4350, S4360 and S4370.

The input terminal 100 receiving the one-time keypad outputs an input window having only divided regions written thereon to the keypad input unit 110, receives a security key from a user, recognizes the security key received from the user, and reads (converts) the security key according to the arrangement of the received one-time keypad, at steps S4410, S4420 and S4430.

The process of outputting a determination result indicating whether the input security key coincides with a preset code may be performed in the same manner as described above, at step S4440.

Hereafter, a security key input system according to a fifth embodiment of the present invention, which provides a security keypad including graphic elements, will be described.

Figure 20:
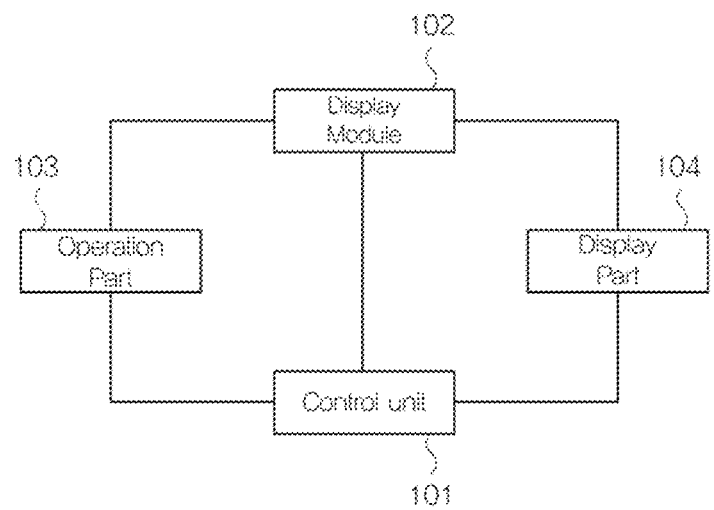
FIG. 20 is a block diagram illustrating the configuration of a security key input system using a one-time keypad according to a fifth embodiment of the present invention.

FIG. 20 is a block diagram illustrating the configuration of a security key input system using a one-time keypad according to a fifth embodiment of the present invention.

As illustrated in FIG. 20, an input terminal 100 forming the security key input system according to the fifth embodiment of the present invention includes a control unit 101, a display unit 102, an operation part 103 and a display part 104.

The control unit 101 includes a plurality of graphic elements and a graphic input part generator which generates a graphic input part 105 having a keypad input function through which a security key can be inputted. The plurality of graphic elements may include patterns, colors and pictures, and any other elements can be used as long as they can be distinguished by a user. The graphic elements may include only patterns and a combination of colors and patterns.

The graphic input part 105 has a three-dimensional (3D) shape, and the respective surfaces of the 3D shape have different graphic elements. The 3D shape may include a polyhedron such as a regular hexahedron or rectangular parallelepiped.

In addition to the graphic elements, the graphic input part 105 has a keypad input function through which a security key can be inputted. The keypad may include a general keypad for inputting the numbers 0 to 9 or a keypad for inputting the numbers 1 to 9 or various special characters. When the graphic input part 105 includes identification marks corresponding to nine numbers as illustrated in FIG. 2, the graphic input part 105 may be formed in the shape of a regular hexahedron having an arrangement of 3×3×3, and when the graphic input part 105 includes identification marks corresponding to nine or more numbers, the graphic input part 105 may be formed in various polyhedron shapes having an arrangement of 4×4×4 instead of the arrangement of 3×3×3.

The graphic input part 105 is displayed on the display unit 102 and enables a user to recognize a graphic element and the information of the keypad. The display unit 102 may be implemented with a general display device such as LCD, and enable a user to input information by directly touching the display unit 102.

The display part 104 displays the information of a graphic element corresponding to a security key among the plurality of graphic elements. For example, when the security key is composed of four-digit numbers, the display part 104 displays four graphic elements corresponding to the respective numbers, and when the security key is composed of five-digit numbers, the display part 104 displays five graphic elements corresponding to the respective numbers. In this case, the respective graphic elements may be different from each other. Alternatively, a part of the graphic elements may be different from each other or all of the graphic elements may be equal to each other.

Figure 21:
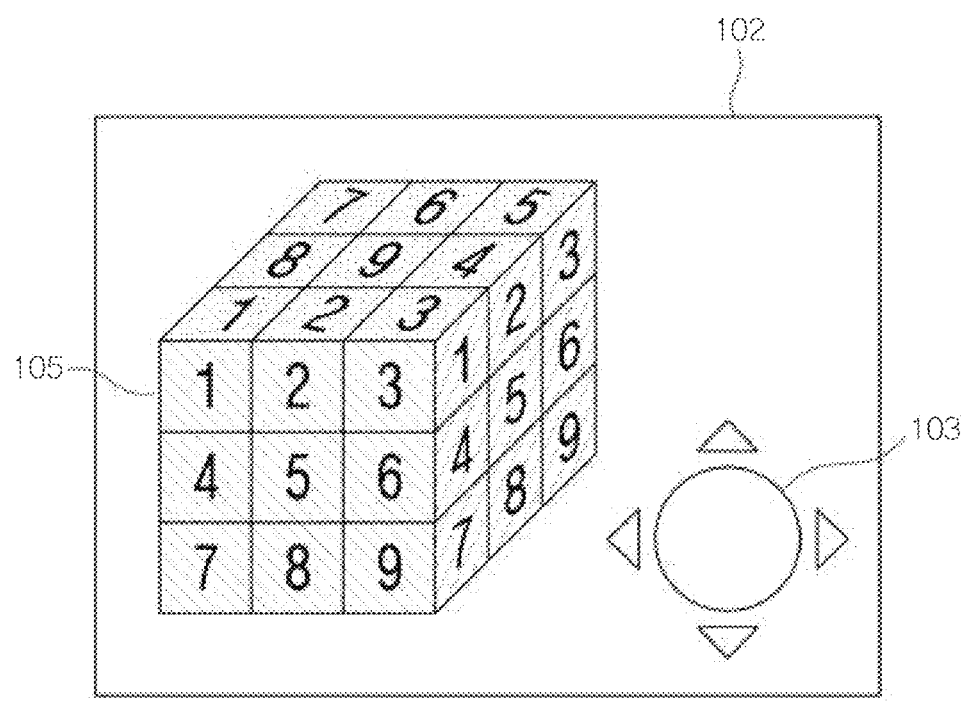
FIG. 21 is a diagram illustrating an example of a graphic input part applied to the fifth embodiment of the present invention.

The operation part 103 has a function of operating the graphic input part 105, in order to select a graphic element corresponding to the information of the graphic element displayed on the display part 104. As illustrated in FIG. 21, the operation part 103 may be displayed with the graphic input part 105 on the display unit 102. Alternatively, the operation part 103 may be separately configured. Furthermore, a user may directly touch the graphic input part 105 in order to directly operate the graphic input part 105. When the graphic input part is directly operated by a user, a capacitive touch panel may be used as the display unit 102.

Figure 23:
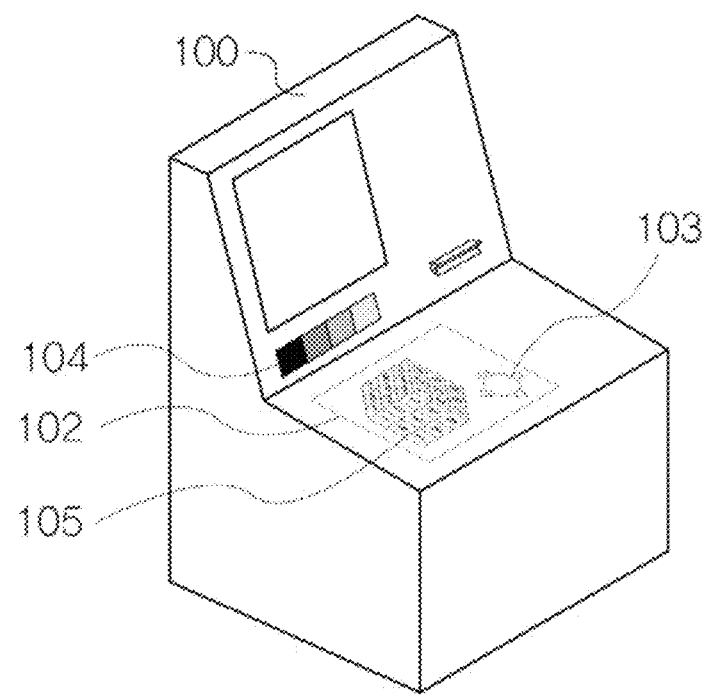
FIG. 23 is a diagram illustrating an example of a graphic input part in which the fifth embodiment of the present invention is applied to an ATM.

The display part 104 may be displayed on the display unit 102. As illustrated in FIG. 23, the display part 104 may be implemented with a separate panel, in order to increase the security level. When a person of malicious intent tries to obtain information in order to steal a security key, the person videos the display unit 102 to obtain the information. In this case, the display part 104 may be implemented with a separate panel located at a position with a different angle from the display unit 102, in order to improve the security level.

Figure 22:
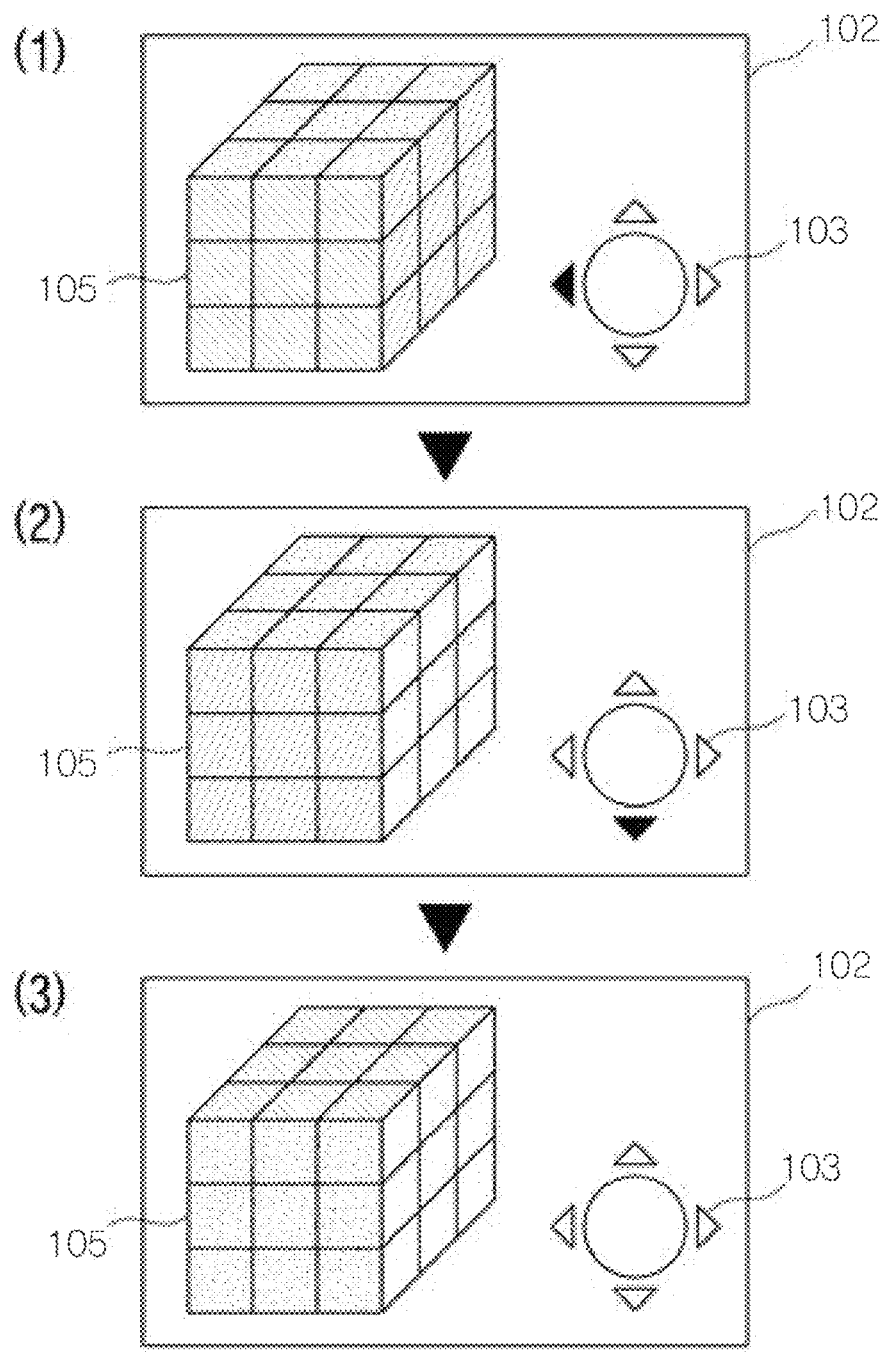
FIG. 22 is a diagram illustrating an example in which a password is inputted through a graphic input part according to the fifth embodiment of the present invention.

FIG. 22 illustrates cubical graphic input parts having different patterns and a keypad through which the numbers 1 to 9 can be inputted. Referring to FIG. 22, the display part 104 is separately configured, and the operation part 103 is displayed with the graphic input part 105 on the display unit 102. The display part 104 includes graphic elements corresponding to the four-digit numbers of a security key, and a user selects a face having the same pattern as the first graphic element through the operation part 103, and inputs one digit of the security key using the keypad displayed on the face. Then, the user selects a face having the same pattern as the second graphic element displayed on the display part 104 using the operation part 103, and inputs another digit of the security key. Only when the user repeats the above-described process to input all the four digits of the security key, the security key is completely inputted.

Figure 24:
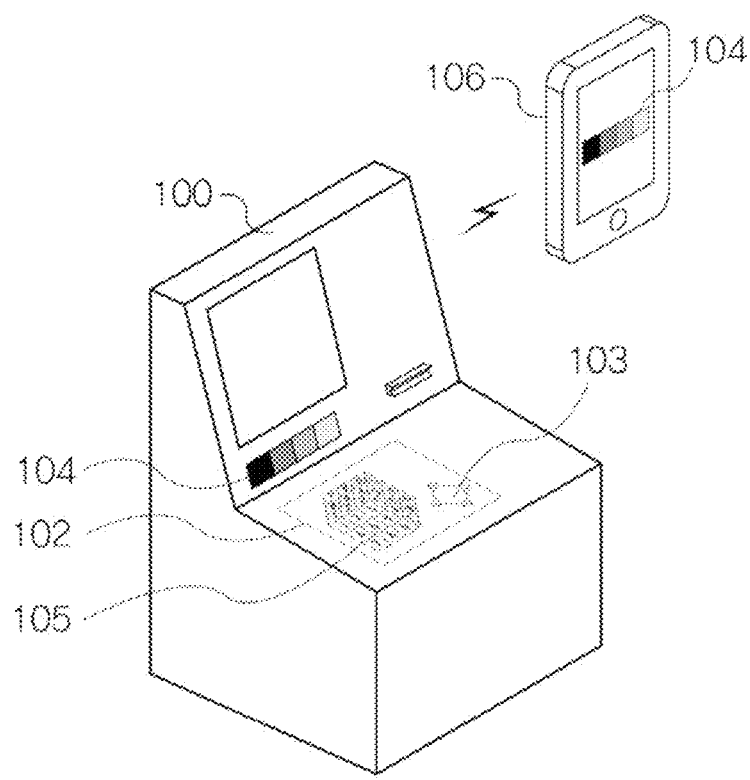
FIG. 24 is a diagram illustrating an example in which the fifth embodiment of the present invention is applied to an ATM through a separate terminal.

In order to increase the security level, the display part 104 may be displayed on a separate output terminal 106 carried by the user as illustrated in FIG. 24. In this case, the output terminal and the control unit need to be synchronized through the separate communication unit 107 or 301.

Figure 25:
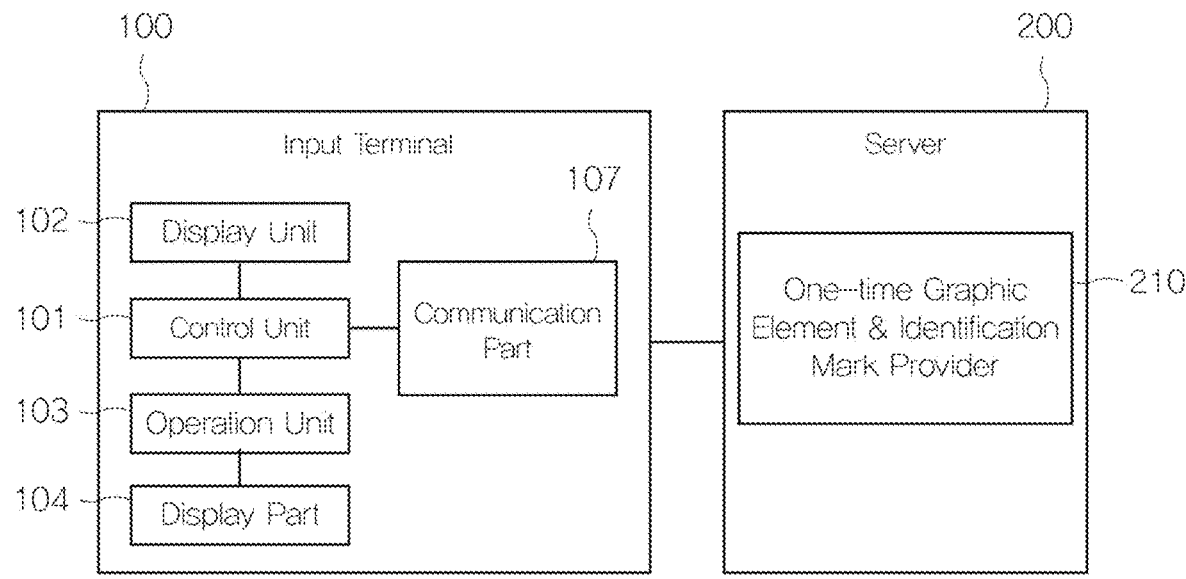
FIG. 25 is a block diagram illustrating an example in which the fifth embodiment of the present invention provides graphic elements and a security key in the form of one-time elements.
Figure 26:
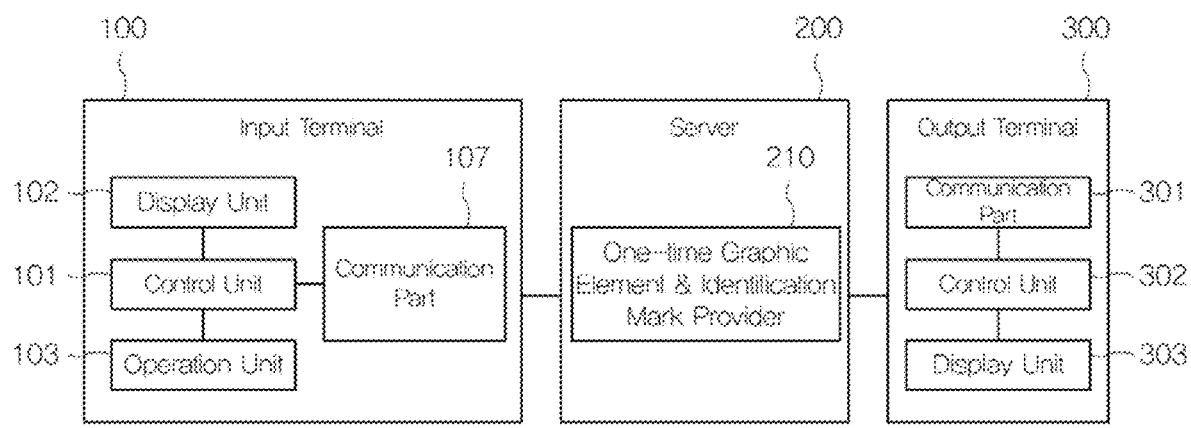
FIG. 26 is a block diagram illustrating an example in which the fifth embodiment of the present invention provides graphic elements and a security key in the form of one-time elements through a separate terminal.

The graphic elements corresponding to the security key and/or the identification marks displayed on the keypad may be provided in the form of one-time elements. In this case, the security level can be further improved. In order to provide graphic elements and identification marks in the form of one-time elements, the security key input system and the server 200 including a one-time graphic element and identification mark provider 210 may be configured as illustrated in FIG. 25, and need to be synchronized with each other. Furthermore, when the display part is displayed on a display unit 303 of a separate terminal 300 as illustrated in FIG. 26, the security key input system, the server 200 and the terminal 300 need to be synchronized with each other, and the synchronization may be performed according to the above-described method.

The numbers or special characters of the identification marks may be randomly positioned. When the identification marks are provided in the form of one-time elements, the numbers or special characters of the identification marks on each face of a 3D polyhedron of the graphic input part may be differently positioned.

Furthermore, whenever a graphic input part is provided in the form of a one-time element, the shape of the 3D polyhedron may be changed. In this case, although an input operation is hacked, the changed polyhedron may be used as an input part, which makes it possible to guarantee the security of the security key.

Figure 27:
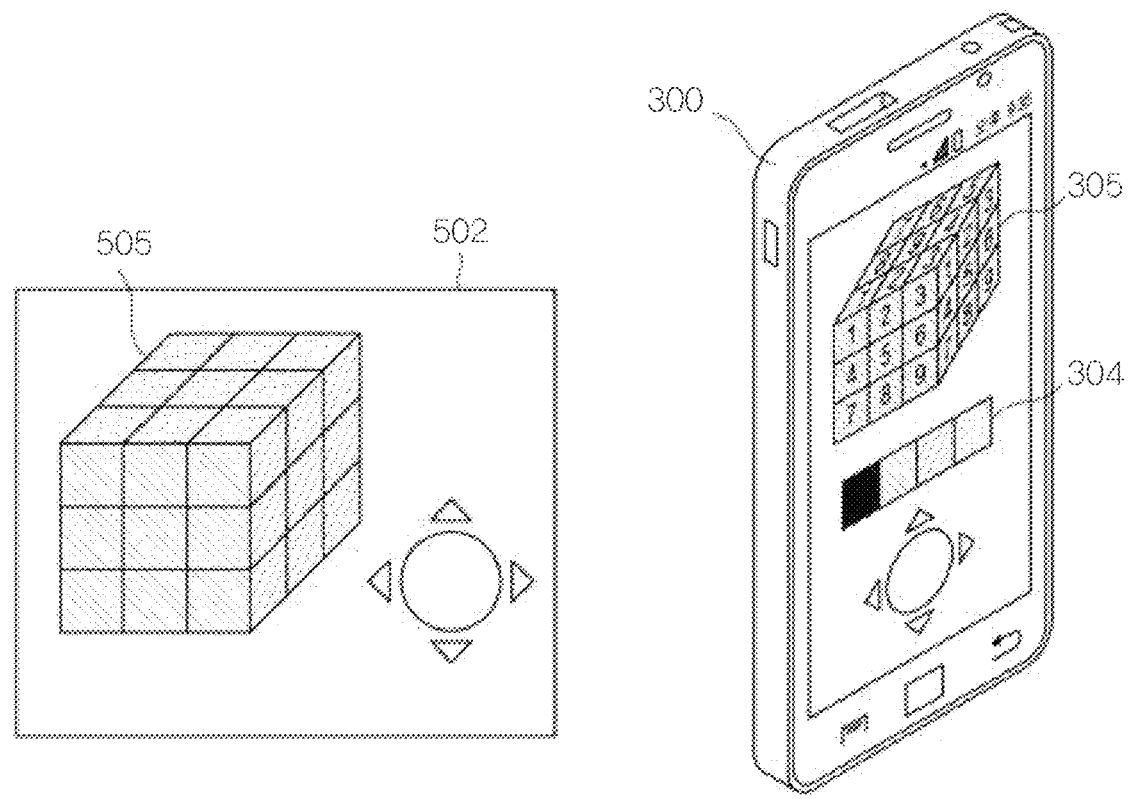
FIG. 27 is a block diagram illustrating an example in which the fifth embodiment of the present invention provides graphic elements and a security key in the form of one-time elements through a separate terminal.

FIG. 27 illustrates another embodiment for the fifth embodiment of the present invention.

In the present embodiment, the identification marks of a graphic input part 505 are displayed on a display unit 303 of a separate terminal 300. That is, the graphic input part 505 includes a keypad which includes a plurality of graphic elements and one or more null keys having no identification marks written thereon and through which a security key can be inputted. The keypad displayed on the display unit 303 of the terminal 300 may have the same shape as the graphic input part 505, and the respective faces thereof may be unfolded and illustrated.

The display part 305 displaying the information of graphic elements corresponding to a security key may be displayed on the terminal 300, and displayed on the display unit 502 of the security key input system. That is, a person skilled in the art to which the present invention pertains may select the position of the display part 305 in consideration of various matters such as the shape of the system and the security level of the place where the system is located.

In order to use a separate terminal, the terminal needs to be synchronized with the security key input system through a separate communication unit. The communication unit may include NFC, wireless LAN, Bluetooth and magnetic field communication. In order to provide a security key and graphic elements in the form of one-time elements, the security key input system, the server and the terminal need to be synchronized.

The control unit including a processor such as CPU generates a plurality of graphic elements and a graphic input part having a keypad input function, displays the generated graphic input part on the display unit, and displays the information of graphic elements corresponding to the security key. Then, the user operates the graphic input part to set the same graphic elements as the graphic elements corresponding to the security key, and inputs the security key. When the user has a plurality of security keys, the user repeats a process of setting graphic elements corresponding to each of the security keys and inputting the security key.

Hereafter, a security key input system and method using a one-time keypad according to a sixth embodiment of the present invention will be described.

Figure 28:
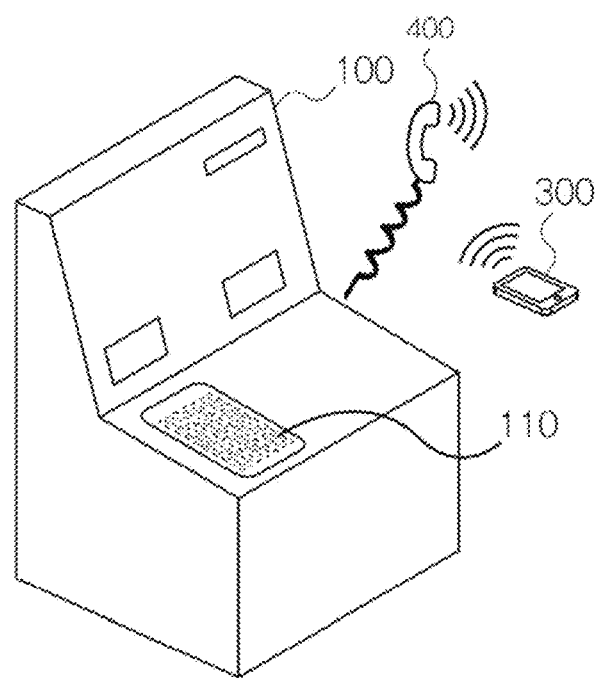
FIG. 28 is a diagram illustrating a security key input system using a one-time keypad according to a sixth embodiment of the present invention.
Figure 29:
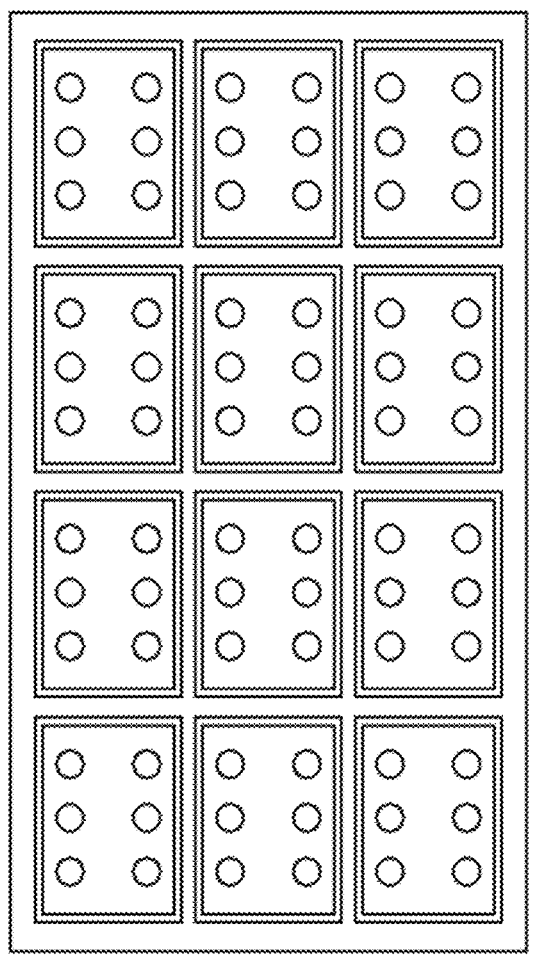
FIG. 29 is a diagram illustrating an example of a security keypad which forms the security key input system using a one-time keypad according to the sixth embodiment of the present invention.
Figure 30:
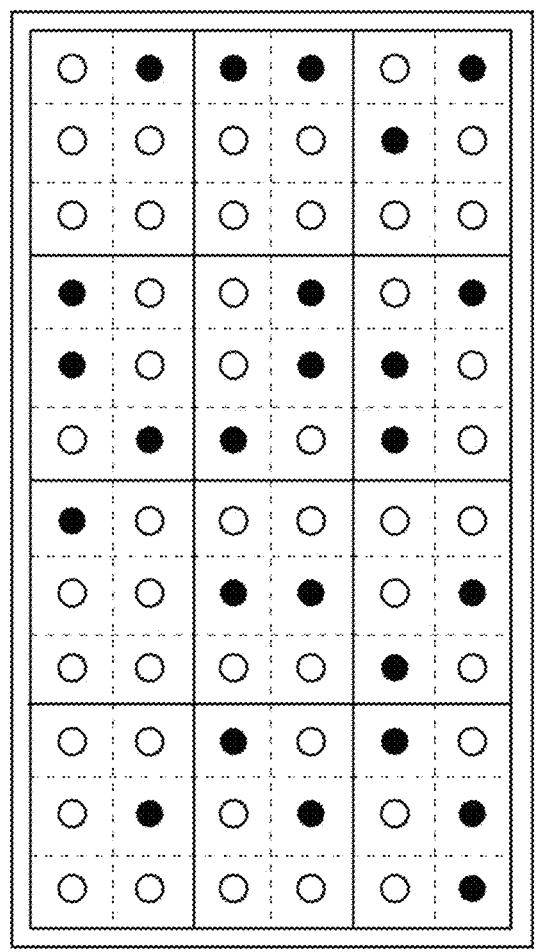
FIG. 30 is a diagram illustrating another example of the security keypad which forms the security key input system using a one-time keypad according to the sixth embodiment of the present invention.

FIG. 28 is a diagram illustrating a security key input system using a one-time keypad according to a sixth embodiment of the present invention, FIG. 29 is a diagram illustrating an example of a security keypad which forms the security key input system using a one-time keypad according to the sixth embodiment of the present invention, and FIG. 30 is a diagram illustrating another example of the security keypad which forms the security key input system using a one-time keypad according to the sixth embodiment of the present invention.

The sixth embodiment of the present invention may be applied to the case in which the security key input system is directed to a blind person. The sixth embodiment of the present invention may be configured and operated in the same manner as the above-described embodiments.

That is, a blind person cannot check a one-time keypad outputted on the output terminal through the display module, and cannot input a security key through a keypad input unit which is implemented with a typical touch panel.

Thus, in the security key input system using a one-time keypad according to the sixth embodiment of the present invention, the output terminal 300 outputs a received one-time keypad through a voice output module.

For this operation, the one-time keypad may be transmitted in the form of a voice message from the input terminal 100, and converted into a voice through the output terminal 300.

The output terminal 300 may correspond to a receiver 400 which is dependently installed in the input terminal, instead of a general portable device.

In this case, the input terminal may directly output a generated one-time keypad as a voice message without using the communication module 130.

The keypad input unit includes an input panel for the blind.

The input panel for the blind may include a variety of input panels which have been already developed and used. Referring to FIG. 29, the input panel for the blind may include mechanical protruding pins through which a user can recognize a message in Braille. Referring to FIG. 30, the input panel for the blind may transmit electrical signals such that a user can recognize a message in Braille.

Hereafter, a security key input system and method using a one-time keypad according to a seventh embodiment of the present invention will be described. The security key input system and method may be provided for the old and the infirm.

Figure 31:
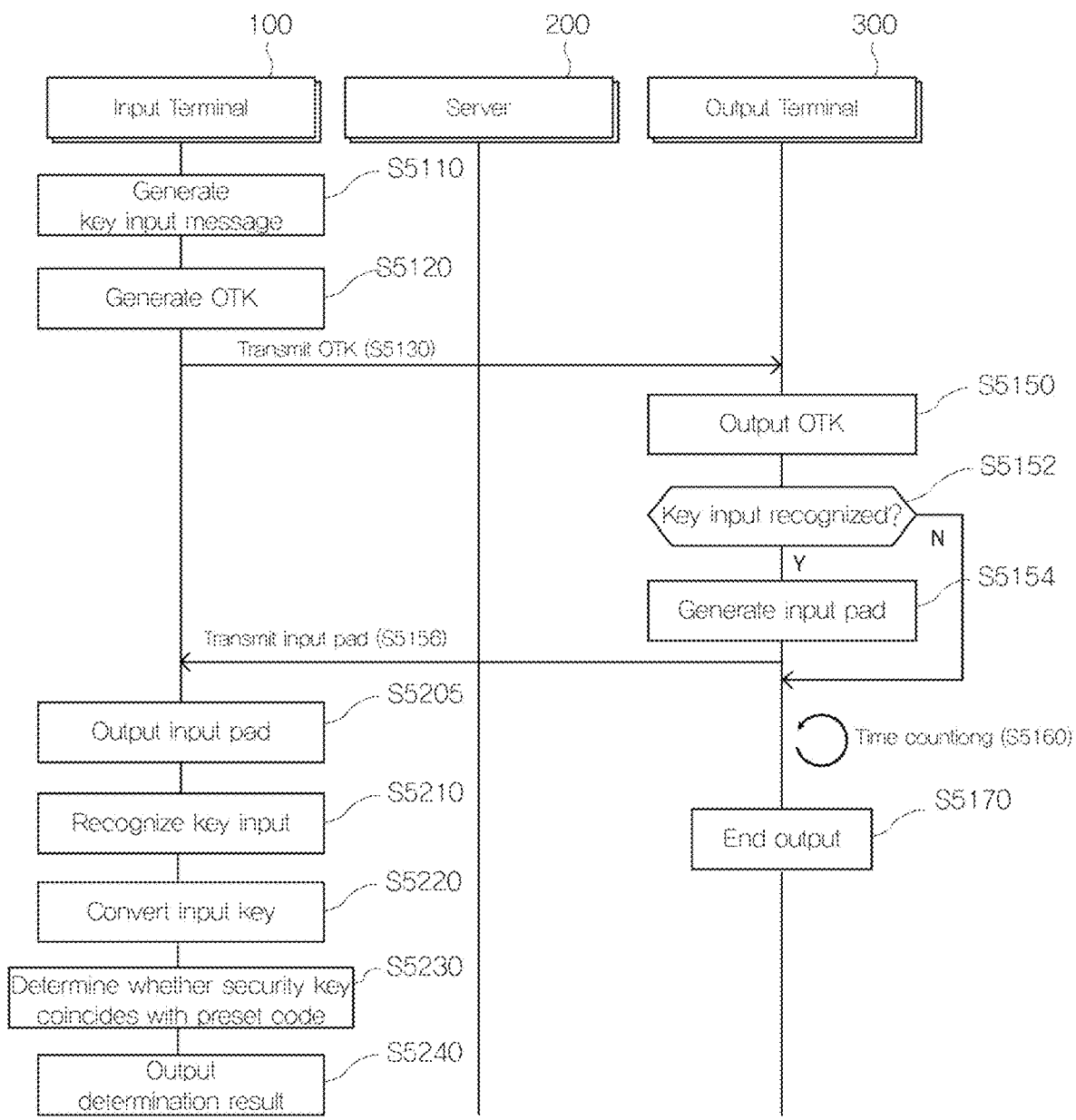
FIG. 31 is flowchart illustrating a security key input method using a one-time keypad according to the seventh embodiment of the present invention.
Figure 32:
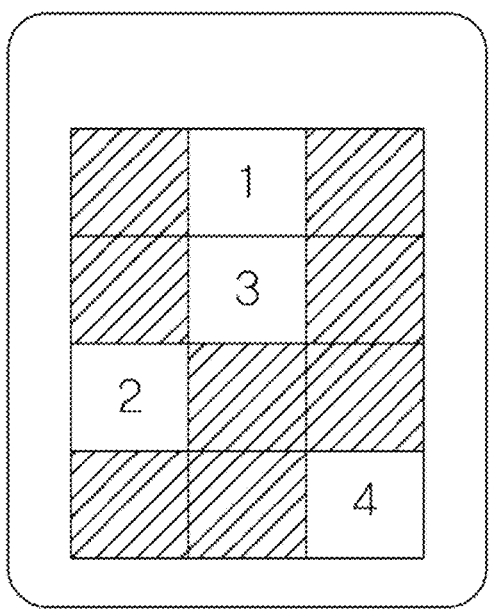
FIG. 32 is a diagram illustrating an example of an input pad which forms the
security key input system using a one-time keypad according to the seventh embodiment of the present invention.

FIG. 31 is flowchart illustrating the security key input method using a one-time keypad according to the seventh embodiment of the present invention, and FIG. 32 is a diagram illustrating an example of an input pad which forms the security key input system using a one-time keypad according to the seventh embodiment of the present invention.

The security key input system and method using a one-time keypad according to the seventh embodiment of the present invention may improve the convenience of users when the users are the old and the infirm. The security key input system and method may be configured and operated in a similar manner to other embodiments of the present invention.

The old and the infirm may have difficulties in inputting a security key through the keypad input unit, compared to when they input a security key through a one-time keypad outputted on the output terminal. Thus, when a user inputs a security key through the output terminal 300 on which a one-time keypad is outputted, the security key input system using a one-time keypad according to the seventh embodiment of the present invention outputs an input pad having an input order written thereon onto the keypad input unit 110.

In the security key input method using a one-time keypad according to the seventh embodiment of the present invention, a key input message is generated in the input terminal 100 at step S5110, the one-time keypad generator 122 generates a one-time keypad at step S5120, and the generated one-time keypad is transmitted in the form of an SMS or MMS message to the output terminal 300 at step S5130.

Then, the output terminal 300 receiving the one-time keypad outputs the received one-time keypad through the display module 310 at step S5150.

The output terminal 300 having outputted the one-time keypad determines whether a security key is inputted from the user, at step S5152. When the security key is inputted from the user, the output terminal 300 generates an input pad using the security key at step S5154.

At this time, the input pad refers to a keypad which includes null keys and on which the input position and order of the security key inputted by the user are displayed.

That is, as illustrated in FIG. 32, the input pad may indicate an input pad on which the position of a security key inputted by the user are displayed as colored or shaded areas and the input order is represented as a serial number.

The output terminal 300 transmits the generated input pad to the input terminal at step S5156.

Then, the controller 320 counts the time at step S5160, outputs a one-time keypad during a preset time, and then ends the output of the one-time keypad at step S5170.

The input terminal 100 receiving the input pad from the output terminal 300 outputs the input pad to the keypad input unit at step S5205.

The input terminal 100 having outputted the security keypad receives a security key from the user at step S5210.

When the input of the security key from the user is recognized, the input terminal 100 reads (converts) the security key according to the arrangement of the generated one-time keypad, at steps S5220.

Then, the input terminal 100 determines whether the input security key coincides with a preset code, at step S5230.

The input terminal 100 outputs the determination result indicating whether the input security key coincides with the preset code, at step S5240.

Therefore, the user can easily input a security key onto the terminal on which the generated one-time keypad is outputted. Then, when the user sequentially inputs the security key according to the input pad outputted to the input terminal, the user can input the security key without a concern of exposure to the outside.

Hereafter, a security key input system and method using a one-time keypad according to an eighth embodiment of the present invention will be described. The security key input system and method using a one-time keypad according to the eighth embodiment of the present invention may be applied to a mobile memory security system.

The mobile memory security system using a one-time keypad according to the eighth embodiment of the present invention may be divided into three embodiments according to a method for generating a one-time keypad.

In a mobile memory security system using a one-time keypad according to an eighth-first embodiment of the present invention, an output terminal generates a one-time keypad.

Figure 33:
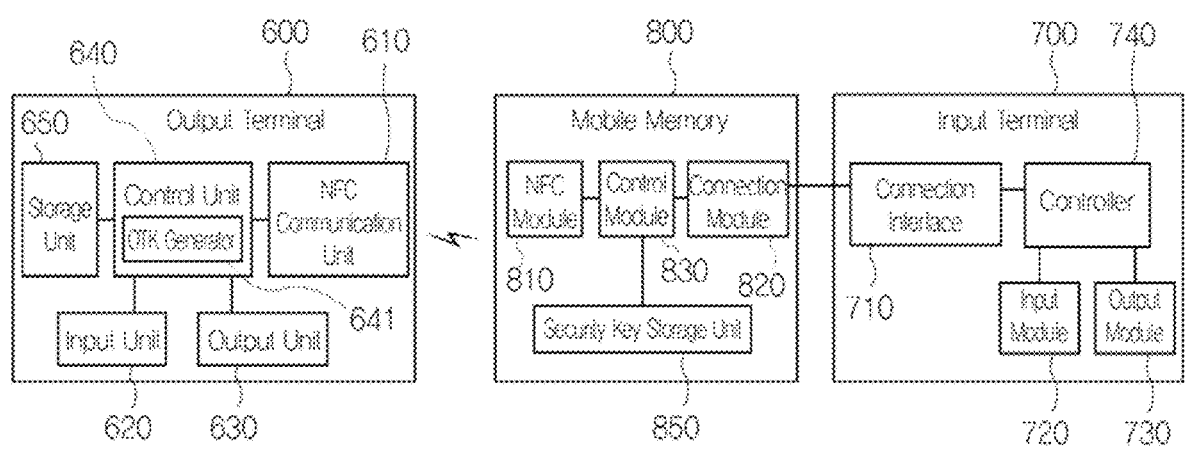
FIG. 33 is a block diagram illustrating a security key input system using a one-time keypad according to an eighth-first embodiment of the present invention.

FIG. 33 is a block diagram illustrating the security key input system using a one-time keypad according to the eighth-first embodiment of the present invention.

As illustrated in FIG. 33, the security key input system according to the eighth-first embodiment of the present invention includes an output terminal 600, a mobile memory 800 and an input terminal 700.

When the mobile memory 800 is connected to the output terminal 600 by NFC, the output terminal 600 generates a one-time keypad and displays the generated one-time keypad to a user. For this operation, the output terminal 600 includes an NFC communication unit 610, an input unit 620, an output unit 630, a control unit 640 and a storage unit 650, and a typical mobile communication terminal may be applied as the output terminal 600.

The NFC communication unit 610 serves to recognize the mobile memory 800 through NFC and transmit data to the mobile memory 800.

The input unit 620 is an input device installed in the terminal, and may include a touch pad or the like.

The output unit 630 serves to output the generated one-time keypad, and a display device of a mobile communication terminal may be applied as the output unit 630.

When the mobile memory 800 is connected through NFC, the control unit 640 generates a one-time keypad and transmits the generated one-time keypad to the mobile memory 800 through the NFC communication unit 610. For this operation, the control unit 640 includes a one-time keypad generator 641 for generating the one-time keypad.

At this time, the one-time keypad generated by the one-time keypad generator 641 is a keypad of which the key arrangement is randomly set by a random algorithm. The one-time keypad is generated as a one-time element and then disappears.

The storage unit 650 serves to temporarily store the generated one-time keypad, in order to transmit the one-time keypad to the mobile memory 800.

The mobile memory 800 is a mobile storage medium which stores a preset security key and is enabled when a security key coinciding with the preset security key is inputted. For this operation, the mobile memory 800 includes an NFC module 810, a connection module 820, a control module 830 and a security key storage unit 850.

The NFC module 810 recognizes the NFC communication unit 610 of the output terminal 600, and receives a generated one-time keypad through NFC.

The connection module 820 is a USB terminal connected to a computer, and serves to transmit the security key stored in the mobile memory 800 and the one-time keypad received from the output terminal 600 to the input terminal 700.

The security key storage unit 850 serves to store the preset security key. The security key may be a password for disabling the security of the mobile memory 800, and set by a user on a PC (Personal Computer) having application programs installed therein.

The control module 830 serves to control the operation of the mobile memory 800. When the mobile memory 800 is connected to the output terminal 600 through NFC, the control module 830 receives a one-time keypad from the output terminal 600, and when the mobile memory 800 is connected to the input terminal 700 through a connection interface, the control module 830 controls the mobile memory 800 to transmit the security key and the received one-time keypad through the connection module 820.

When the mobile memory 800 is connected to the input terminal 700, the input terminal 700 receives the security key and the one-time keypad from the mobile memory 800, receives a security key from the user, determines whether the security key received from the mobile memory 800 coincides with the security key received from the user, and sets whether to disable the security of the mobile memory 800.

For this operation, the input terminal 700 includes a connection interface 710, a controller 740, an input module 720 and an output module 730.

The connection interface 710, to which the mobile memory 800 is connected through the connection module 820, may include a typical USB connection interface.

The input module 720 serves to receive a security key from a user, and a human interface such as a touch screen or mouse may be applied as the input module 720.

The output module 730 serves to output the one-time keypad, and a general display device may be applied as the output module 730.

The controller 740 outputs the one-time keypad to the output module 730, the one-time keypad being generated by the output terminal and received through the mobile memory 800.

At this time, the controller 740 generates a security keypad having no identification marks written thereof, and outputs the generated security keypad onto the generated one-time keypad.

Thus, the output terminal 600 outputs the generated one-time keypad in a state where the identification marks are written on the one-time keypad, and the input terminal 700 outputs the generated one-time keypad as a security keypad of which the identification marks are deleted.

The controller 740 receives a security key from the user on the security keypad, determines whether the security key transmitted from the mobile memory 800 coincides with the security key inputted from the user, and sets whether to disable the security of the mobile memory 800.

Hereafter, a security key input method according to the eighth-first embodiment of the present invention will be described in detail.

Figure 34:
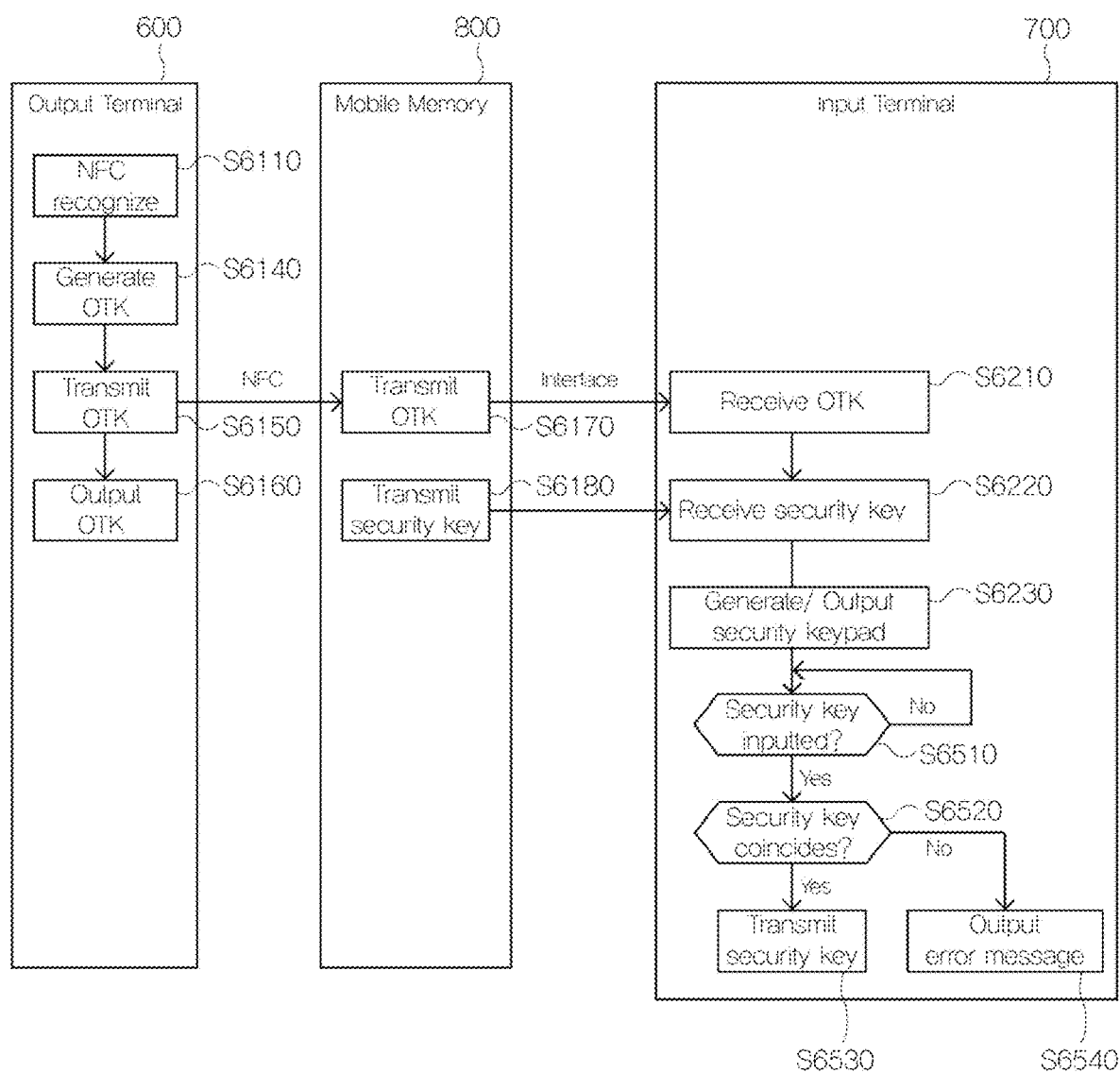
FIG. 34 is a flowchart illustrating a mobile memory security method according to the eighth-first embodiment of the present invention.
Figure 35:
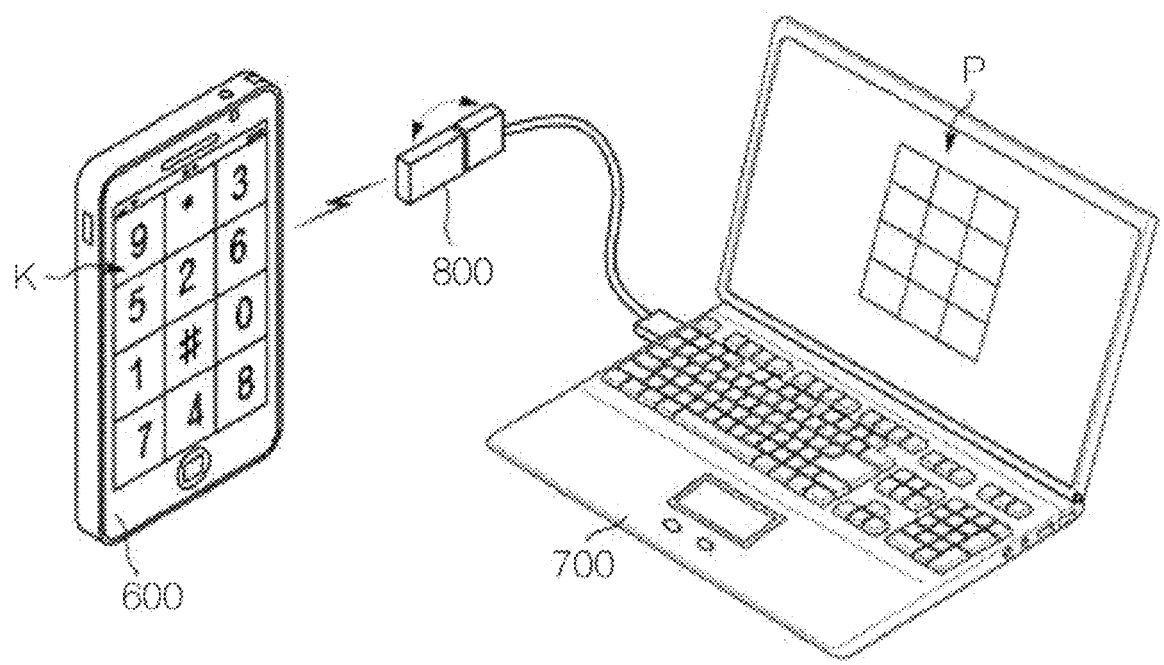
FIG. 35 is a diagram illustrating an operation example of the mobile memory security system using a one-time keypad according to the eighth-first embodiment of the present invention.

FIG. 34 is a flowchart illustrating a mobile memory security method according to the eighth-first embodiment of the present invention, and FIG. 35 is a diagram illustrating an operation example of the mobile memory security system using a one-time keypad according to the eighth-first embodiment of the present invention.

As illustrated in FIG. 34, the mobile memory security method according to the eighth-first embodiment of the present invention is started from step S6110 at which the output terminal 600 recognizes that the mobile memory 800 is connected to the output terminal 600.

That is, when the mobile memory 800 is connected to the output terminal 600 through NFC, the output terminal 600 generates a one-time keypad at step S6140.

Since the one-time keypad has been already described, the detailed descriptions thereof are omitted herein.

Then, the output terminal 600 transmits the generated one-time keypad to the mobile memory at step S6150. As illustrated in FIG. 35, the output terminal 600 outputs the one-time keypad through the output unit 630 at step S6160.

Then, the mobile memory 800 transmits the received one-time keypad to the input terminal 700 at step S6170, and transmits the security key stored in the security key storage unit 850 to the input terminal 700 at step S6180.

When the mobile memory 800 is connected to the input terminal 700 through the connection interface, the input terminal 700 receives the one-time keypad and the security key from the mobile memory 800 at steps S6210 and S6220.

Then, the input terminal 700 generates a security keypad from the received one-time keypad and outputs the generated security keypad through the output module 730 at step S6230.

At this time, as illustrated in FIG. 35, the security keypad indicates a keypad which has the same arrangement as the one-time keypad but has no identification marks written thereon.

When the security key is inputted onto the security keypad through the input module 720 from the user, the controller 740 determines whether the security key transmitted from the mobile memory 800 coincides with the security key inputted by the user, at steps S6510 and S6520.

Then, when the security key transmitted from the mobile memory 800 coincides with the security key inputted by the user, the controller 740 disables the security of the mobile memory 800 such that data can be transferred and written to the mobile memory 800, at step S6530.

On the other hand, when the security key transmitted from the mobile memory 800 does not coincide with the security key inputted by the user, the controller 740 outputs an error message indicating that a wrong security key was inputted, while maintaining the security state of the mobile memory 800, at step S6540.

The time-series order of the respective steps is only an example for convenience of description, and may be changed in a range that does not disturb the performance of a unit function.

For example, the transmission of the security key from the mobile memory 800 to the input terminal 700 may be performed any time before determining whether the security key transmitted from the mobile memory 800 coincides with the security key inputted from the user.

Next, in a mobile memory security system and method using a one-time keypad according to an eighth-second embodiment of the present invention, a one-time keypad is generated by an input terminal.

Figure 36:
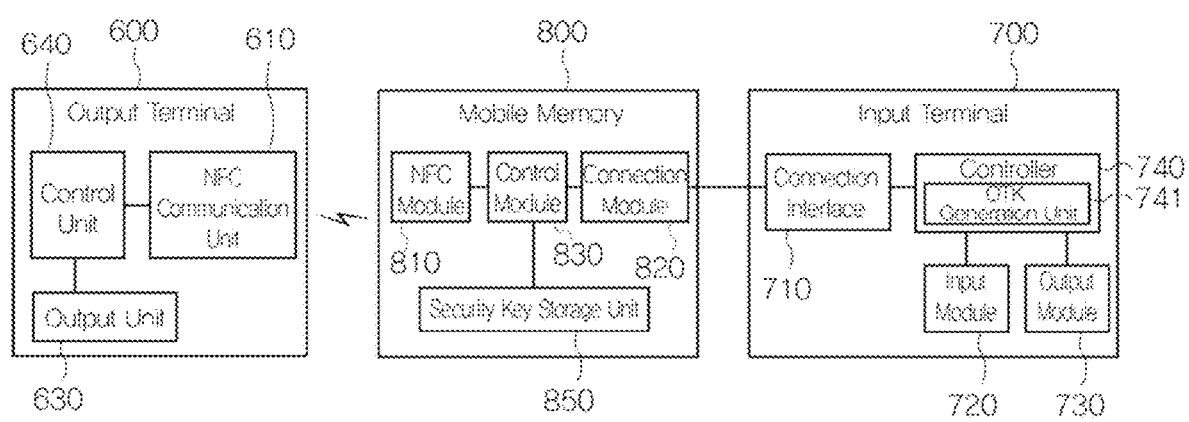
FIG. 36 is a block diagram illustrating a mobile memory security system using a one-time keypad according to an eighth-second embodiment of the present invention.
Figure 37:
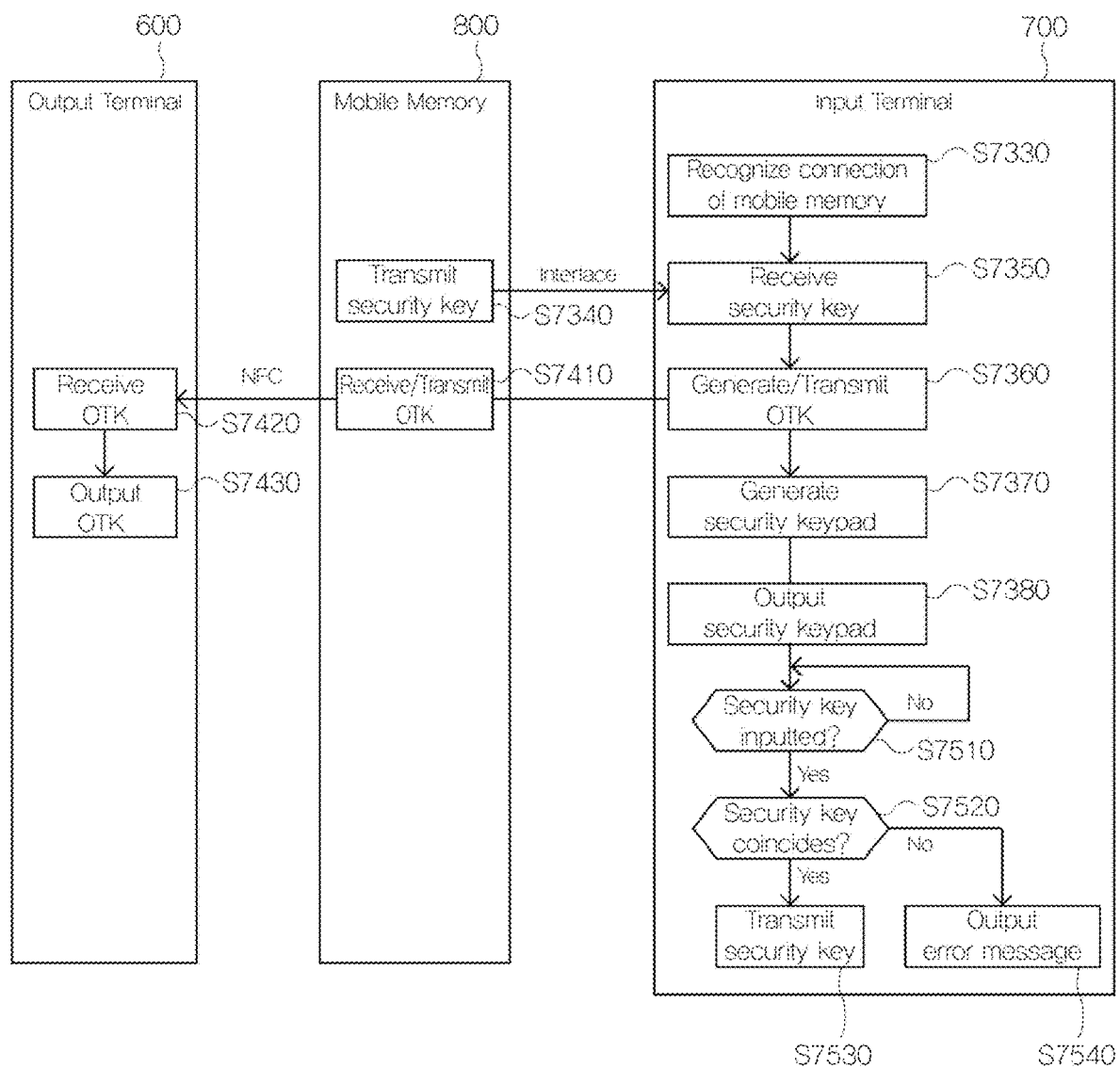
FIG. 37 is a flowchart illustrating a mobile memory security method using a one-time keypad according to the eighth-second embodiment of the present invention.

FIG. 36 is a block diagram illustrating a mobile memory security system using a one-time keypad according to an eighth-second embodiment of the present invention, and FIG. 37 is a flowchart illustrating a mobile memory security method using a one-time keypad according to the eighth-second embodiment of the present invention.

As illustrated in FIG. 36, the mobile memory security system according to the eighth-second embodiment of the present invention includes an output terminal 600, a mobile memory 800 and an input terminal 700.

When the mobile memory 800 is connected to the output terminal 600 by NFC, the output terminal 600 receives a one-time keypad from the mobile memory 800 and outputs the generated one-time keypad. For this operation, the output terminal 600 includes an NFC communication unit 610, an output unit 630 and a control unit 640, and a typical mobile communication terminal may be applied as the output terminal 600.

The NFC communication unit 610 is connected to the mobile memory 800 through NFC, and receives a one-time keypad from the mobile memory 800.

The mobile memory 800 is a mobile storage medium which stores a preset security key and is enabled when a security key coinciding with the preset security key is inputted. For this operation, the mobile memory 800 includes an NFC module 810, a connection module 820, a control module 830 and a security key storage unit 850.

The NFC module 810 recognizes the NFC communication unit 610 of the output terminal 600, and transmits the generated one-time keypad through NFC.

The connection module 820 is connected to a computer, and the security key storage unit 850 stores the preset security key.

The control module 830 serves to control the operation of the mobile memory 800. When the mobile memory 800 is connected to the input terminal 700 through a connection interface, the control module 830 provides the security key to the input terminal 700, and receives a one-time keypad from the input terminal 700. When the mobile memory 800 is connected to the output terminal 600 through NFC, the control module 830 controls the mobile memory 800 to transmit the received one-time keypad to the output terminal 600.

When the mobile memory 800 is connected to the input terminal 700, the input terminal 700 receives the security key from the mobile memory 800, generates a one-time keypad, transmits the generated one-time keypad to the mobile memory 800, receives a security key from the user, determines whether the security key received from the mobile memory 800 coincides with the security key received from the user, and sets whether to disable the security of the mobile memory 800.

For this operation, the input terminal 700 includes a connection interface 710, a controller 740, an input module 720 and an output module 730.

The controller 740 includes a one-time keypad generation module 741, and generates a one-time keypad through the one-time keypad generation module 741.

The one-time keypad is a keypad of which the key arrangement is randomly set through a random algorithm. As described above, the one-time keypad is generated as a one-time element and then disappears.

The controller 740 generates a security keypad from the one-time keypad and outputs the generated security keypad through the output module 730.

The controller 740 receives a security key from the user on the output security keypad, determines whether the security key transmitted from the mobile memory 800 coincides with the security key inputted from the user, and sets whether to disable the security of the mobile memory 800.

As illustrated in FIG. 37, the mobile memory security method according to the eighth-second embodiment of the present invention is started from step S7330 at which the input terminal 700 recognizes that the mobile memory 800 is connected to the input terminal 700.

Then, when the mobile memory 800 is connected to the input terminal 700 through the connection interface, the input terminal 700 receives the security key from the mobile memory 800 at steps S7340 and S7350.

Then, the input terminal 700 generates a one-time keypad, and transmits the one-time keypad to the mobile memory 800 at step S7360.

Since the one-time keypad has been already described above, the detailed descriptions thereof are omitted herein.

The input terminal 700 generates a security keypad from the generated one-time keypad and outputs the generated security keypad through the output module 730 at steps S7370 and S7380.

At this time, the security keypad indicates a keypad which has the same arrangement as the one-time keypad but has no identification marks written thereon.

When the security key is inputted onto the security keypad through the input module 720 from the user, the controller 740 determines whether the security key transmitted from the mobile memory 800 coincides with the security key inputted by the user, at steps S7510 and S7520.

Then, when the security key transmitted from the mobile memory 800 coincides with the security key inputted by the user, the controller 740 disables the security of the mobile memory 800 such that data can be transferred and written to the mobile memory 800, at step S7530.

On the other hand, when the security key transmitted from the mobile memory 800 does not coincide with the security key inputted by the user, the controller 740 outputs an error message indicating that a wrong security key was inputted, while maintaining the security state of the mobile memory 800, at step S7540.

The mobile memory 800 receiving the one-time keypad transmits the one-time keypad to the output terminal 600.

The output terminal 600 receiving the one-time keypad outputs the received one-time keypad through the output unit 630 at steps S7410, S7420 and S7430.

In this case, the transmission of the security key from the mobile memory 800 to the input terminal 700 may be performed any time before determining whether the security key transmitted from the mobile memory 800 coincides with the security key inputted from the user.

In a mobile memory security system using a one-time keypad according to an eighth-third embodiment of the present invention, a one-time keypad is generated in the output terminal and the input terminal according to a time synchronization method.

In the mobile memory security system using a one-time keypad according to the eighth-third embodiment of the present invention, both the output terminal 600 and the input terminal 700 generate a one-time keypad in order to reinforce the security.

Figure 38:
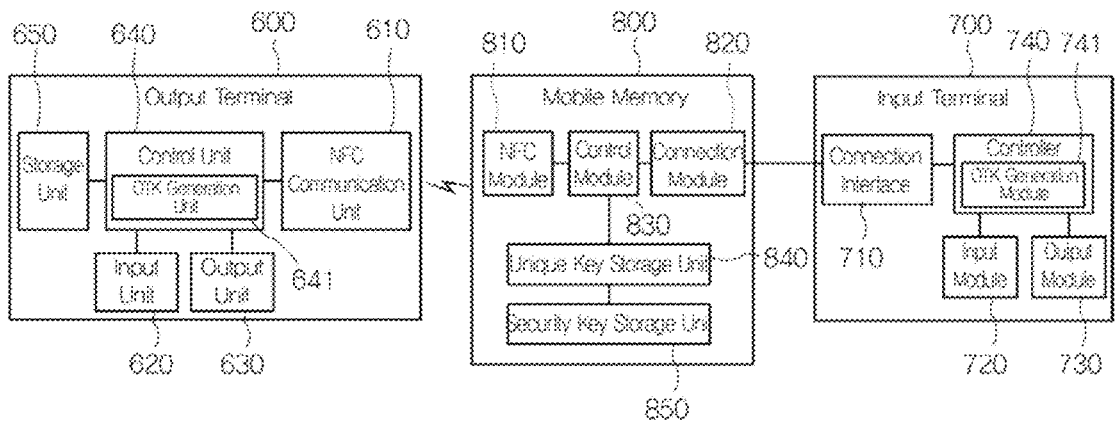
FIG. 38 is a block diagram illustrating a mobile memory security system using a one-time keypad according to an eighth-third embodiment of the present invention.
Figure 39:
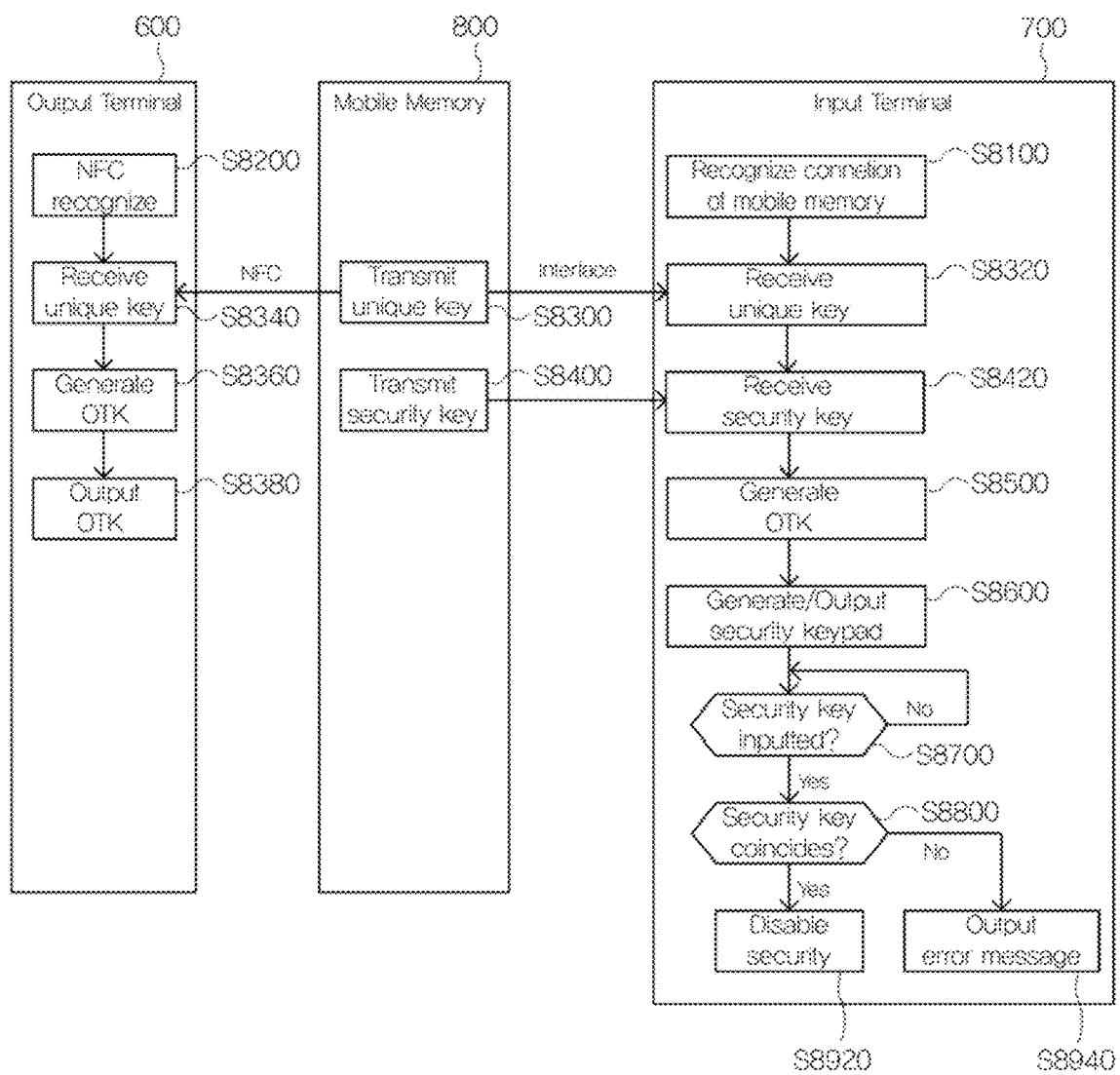
FIG. 39 is a flowchart illustrating a mobile memory security method using a one-time keypad according to the eighth-third embodiment of the present invention

FIG. 38 is a block diagram illustrating the mobile memory security system using a one-time keypad according to the eighth-third embodiment of the present invention, and FIG. 39 is a flowchart illustrating the mobile memory security method using a one-time keypad according to the eighth-third embodiment of the present invention.

First, as illustrated in FIG. 38, the security key input system using a one-time keypad according to the eighth-third embodiment of the present invention includes an output terminal 600, a mobile memory 800 and an input terminal 700.

The output terminal 600 receives a unique key from the mobile memory 800, generates a one-time keypad, and displays the generated one-time keypad to a user. For this operation, the output terminal 600 includes an NFC communication unit 610, an input unit 620, an output unit 630, a control unit 640 and a storage unit 650, and a typical mobile communication terminal may be applied as the output terminal 600.

The NFC communication unit 610 serves to receive the unique key from the mobile memory 800 through NFC.

The input unit 620 which is an input device installed in the terminal is not a necessary component required for performing the function according to the present embodiment.

The output unit 630 serves to the output the generated one-time keypad, and a display device of a mobile communication terminal may be applied as the output unit 630.

The control unit 640 serves to generate a one-time keypad using the unique key transmitted from the mobile memory 800. For this operation, the control unit 640 includes a one-time keypad generator 641 for generating the one-time keypad.

At this time, the one-time keypad generator 641 generates a one-time keypad according to the time synchronization method.

The storage unit 650 serves to store the unique key received from the mobile memory 800 while the one-time keypad is generated, and a cache memory of a mobile communication terminal may be applied as the storage unit 650.

The mobile memory 800 is a mobile storage medium which stores a preset security key and is enabled when a security key coinciding with a preset security key is inputted. For this operation, the mobile memory 800 includes an NFC module 810, a connection module 820, a control module 830, a unique key storage unit 840 and a security key storage unit 850.

The NFC module 810 recognizes the NFC communication unit 610 of the output terminal 600, such that data can be transmitted through NFC.

The connection module 820 is a USB terminal connected to a computer, and transmits and receives data between the mobile memory 800 and the computer.

The security key storage unit 850 serves to store a preset security key, and the unique key storage unit 840 serves to store a unique key. The unique key may indicate a value which uniquely set for the mobile memory 800, and include a serial number. The unique key may be transmitted to the output terminal 600 and the input terminal 700, and used for generating a one-time keypad according to the time synchronization method.

The control module 830 serves to control the operation of the mobile memory 800. When the mobile memory 800 is connected to the output terminal 600 through NFC, the control module 830 transmits the unique key to the output terminal 600, and when the mobile memory 800 is connected to the input terminal 700, the control module 830 transmits the security key and the unique key through the connection module 820.

When the mobile memory 800 is connected to the input terminal 700, the input terminal 700 generates a one-time keypad, receives a security key from a user through the one-time keypad, receives a security key from the mobile memory 800, determines whether the security key received from the user coincides with the security key received from the mobile memory 800, and sets whether to disable the security of the mobile memory.

For this operation, the input terminal 700 includes a connection interface 710, a controller 740, an input module 720 and an output module 730.

The connection interface 710, to which the mobile memory 800 is connected through the connection module 820, may include a typical USB connection interface.

The input module 720 serves to receive a security key from a user, and a human interface such as a touch screen or mouse may be applied as the input module 720.

The output module 730 serves to output the one-time keypad, and a general display device may be applied as the output module 730.

The controller 740 includes a one-time keypad generation module 741. The controller 740 generates the one-time keypad, generates a security keypad from the generated one-time keypad, and outputs the generated security keypad through the output module 730. Furthermore, the controller 740 compares the security key transmitted from the mobile memory 800 to the security key inputted through the input module 720. When the security key transmitted from the mobile memory 800 coincides with the security key inputted through the input module 720, the controller 740 disables the security of the mobile memory 800.

Hereafter, the one-time keypad generation method of the one-time keypad generator 641 and the one-time keypad generation module 741 will be described in detail.

Since the one-time keypad is generated as a one-time element and then disappears, the one-time keypad has a random key arrangement. At this time, 'random' indicates that the one-time keypad is randomly generated by an algorithm. Since the method for generating a one-time keypad has been described in detail with reference to the third embodiment of the present invention, the detailed descriptions thereof are omitted herein.

Hereafter, a mobile memory security method using a one-time keypad according to the eighth-third embodiment of the present invention will be described in detail.

As illustrated in FIG. 39, the mobile memory security method using a one- time keypad according to the eighth-third embodiment of the present invention is started from step S8100 or S8200 at which it is recognized that the mobile memory 800 is connected to the input terminal 700 or the output terminal 600.

First, the case in which the mobile memory 800 is connected to the output terminal 600 through NFC will be described. When the mobile memory 800 is connected to the output terminal 600 at step S8200, the mobile memory 800 transmits a unique key to the output terminal 600 at step S8340.

Then, when the output terminal 600 receives the unique key, the output terminal 600 generates a one-time keypad using the received unique key according to the time synchronization method, at step S8360.

At this time, since the method for generating the one-time keypad has been described above, the detailed descriptions thereof are omitted herein.

Then, the output terminal 600 outputs the generated one-time keypad through the output unit 630 at step S8380.

Next, the case in which the mobile memory 800 is connected to the input terminal 700 will be described. When the mobile memory 800 is connected to the input terminal 700 through the connection interface at step S8100, the mobile memory 800 transmits a unique key to the input terminal 700, such that the input terminal 700 receives the unique key, at steps S8300 and S8320.

The mobile memory 800 transmits a security key to the input terminal 700 such that the input terminal 700 receives the security key, at steps S8400 and S8420.

When the input terminal 700 receives the unique key and the security key from the mobile memory 800 through the connection interface, the one-time keypad generation module of the input terminal 700 generates a one-time keypad through the received unique key according to the time synchronization method, at step S8500.

The one-time keypad may be configured in the same manner as described above.

The input terminal 700 generates a security keypad having no identification marks written thereon from the generated one-time keypad and outputs the generated security keypad through the output module 730 at step S8600.

Then, when the security key is inputted onto the security keypad through the input module 720 from the user, the controller 740 determines whether the security key transmitted from the mobile memory 800 coincides with the security key inputted by the user, at steps S8700 and S8800.

When the security key transmitted from the mobile memory 800 coincides with the security key inputted by the user, the controller 740 disables the security of the mobile memory 800 such that data can be transferred and written to the mobile memory 800, at step S8920.

On the other hand, when the security key transmitted from the mobile memory 800 does not coincide with the security key inputted by the user, the controller 740 outputs an error message indicating that a wrong security key was inputted, while maintaining the security state of the mobile memory 800, at step S8940.

The time-series order of the respective steps is only an example for convenience of description, and may be changed in a range that does not disturb the performance of a unit function.

For example, the order in which the mobile memory 800 is connected to the output terminal 600 or the input terminal 700 may be changed, and the mobile memory 800 may be connected to the output terminal 600 and the input terminal 700 at the same time. That is, when the mobile memory 800 is connected to the output terminal 600 and the input terminal 700 within a unit time of the time synchronization, the same one-time keypad may be generated. Thus, the time-series order may be changed.

Furthermore, the transmission of the security key from the mobile memory 800 to the input terminal 700 may be performed any time before determining whether the security key transmitted from the mobile memory 800 coincides with the security key inputted from the user.

According to the present embodiment, the output position (terminal) of the one-time keypad and the input position of the security are different from each other. Thus, although the input terminal is hacked or a user's inputting a security key is exposed to others, they cannot know which numbers were inputted. Thus, the security of the preset security key may be significantly improved.

The security key input system and method according to the embodiments of the present invention can provide the following effects.

Although a user inputting a password of a keypad input device such as a door lock or an input window of ATM is exposed, the security key input system and method can reduce a concern about password exposure. Furthermore, although a smart terminal is hacked by an electronic means, the security key input system and method can prevent password exposure.

Specifically, since a password input is performed through the keypad input device and the arrangement of the one-time keypad is provided through the smart terminal, a person of malicious intent may acquire the password only when the figure of the smart terminal user who inputs the password through the keypad input device is exposed in a state where the smart terminal is hacked. Thus, the exposure of the password is impossible.

Furthermore, since a security key is inputted to various types of keypad input devices through a one-time keypad generated through a smart terminal, a user may be practiced in inputting a password. Thus, the usability may be improved.

Furthermore, since the security keypad can be implemented with color images as well as numbers, the security can be reinforced and easily expanded.

Furthermore, a one-time security key can be stored and used. Thus, when a user needs to allow one-time authentication, the security key input system and method can provide a security key to others while maintaining security.

Furthermore, since a security key can be inputted to various types of systems through the graphic elements and the security key input system, security, fun and usability can be improved.

Furthermore, when a preset password is inputted to a mobile storage medium through a terminal, the security key input system and method can generate a one-time keypad of which the key arrangement is randomly set, and receives a password through the one-time keypad, thereby improving security of the mobile storage medium.

Furthermore, a terminal for outputting a generated one-time keypad and a terminal for inputting a password may be separately provided, and identification marks may not be outputted onto the terminal for inputting a password, which makes it possible to further improve the security level of the password.

While various embodiments have been described above, it will be understood to those skilled in the art that the embodiments described are by way of example only. Accordingly, the disclosure described herein should not be limited based on the described embodiments.

What is claimed is:

1. A security key input system using a one-time keypad, comprising:
    an input terminal; and
    an output terminal,
    wherein the output terminal is configured to:
        the one-time keypad based on a same synchronization key generated by the input terminal and the output terminal, and
        transmit the one-time keypad through a server, and
    wherein the input terminal is configured to:
        output an input window including one or more null keys, each of the one or more null keys having no identification mark written thereon,
        receive a security key inputted by a user through the input window,
        receive the one-time keypad,
        determine whether the security key coincides with a preset code, and
        approve, based on the determination, whether to disable security.

2. The security key input system of claim 1, wherein the input terminal comprises at least one of an automated teller machine (ATM), a door lock, a safe, or a computer.

3. The security key input system of claim 2, wherein the one-time keypad comprises a keypad of which a key arrangement is randomly set, and the key arrangement is changed whenever the one-time keypad is generated.

4. The security key input system of claim 2, wherein a number of one-time keypads to be generated is equal to a number of security keys to be inputted, and
    wherein a distinct one-time keypad of the one-time keypads is provided in response to each security key input.

5. The security key input system of claim 2, wherein the input terminal is further configured to:
    determine whether the security key coincides with the preset code, and
    output the determination result through at least one of a color change of the input window or a sound output.

6. The security key input system of claim 2, wherein the input window comprises a larger number of null keys than a difference between a number of entire input regions of the input window and a number of digits included in a preset security key.

7. The security key input system of claim 6, wherein the entire input regions of the input window are set to null keys.

8. A security key input method using a one-time keypad, comprising the steps of:
    (A) generating, by an output terminal, the one-time keypad based on a same synchronization key generated by an input terminal and the output terminal;
    (B) transmitting, by the output terminal, the generated one-time keypad to the input terminal;
    (C) outputting, by the output terminal, the generated one-time keypad;
    (D) outputting, by the input terminal, a security keypad including one or more null keys each having no identification mark written thereon, and receiving a security key from a user; and
    (E) determining, by the input terminal, whether the security key inputted from the user coincides with a preset code, through the one-time keypad, and determining whether the security key is correct or wrong.

9. The security key input method of claim 8, wherein the step (B) of transmitting the generated one-time keypad is performed through a server to which the output terminal and the input terminal are connected.

10. The security key input method of claim 8, wherein the outputting of the one-time keypad is continued for a preset time, and then ended.

* * * * *